(12) United States Patent
Stephenson et al.

(10) Patent No.: US 11,760,653 B2
(45) Date of Patent: Sep. 19, 2023

(54) ACIDIC ZIRCONIUM HYDROXIDE

(71) Applicant: Magnesium Elektron Limited, Manchester (GB)

(72) Inventors: Hazel Stephenson, Manchester (GB); Iryna Chepurna, Manchester (GB); Deborah Jayne Harris, Manchester (GB); David Scapens, Manchester (GB)

(73) Assignee: Magnesium Elektron Limited, Manchester (GB)

( * ) Notice: Subject to any disclaimer, the term of this patent is extended or adjusted under 35 U.S.C. 154(b) by 0 days.

(21) Appl. No.: 16/345,275

(22) PCT Filed: Jan. 30, 2017

(86) PCT No.: PCT/GB2017/050233
§ 371 (c)(1),
(2) Date: Apr. 26, 2019

(87) PCT Pub. No.: WO2018/078313
PCT Pub. Date: May 3, 2018

(65) Prior Publication Data
US 2019/0292066 A1 Sep. 26, 2019

(30) Foreign Application Priority Data

Oct. 27, 2016 (WO) ................ PCT/GB2016/053332
Oct. 27, 2016 (WO) ................ PCT/GB2016/053335

(51) Int. Cl.
*C01G 25/02* (2006.01)
*B01J 21/06* (2006.01)
(Continued)

(52) U.S. Cl.
CPC ........... *C01G 25/02* (2013.01); *B01D 53/945* (2013.01); *B01J 13/0021* (2013.01); *B01J 13/0047* (2013.01); *B01J 21/066* (2013.01); *B01J 23/10* (2013.01); *B01J 35/002* (2013.01); *B01J 35/023* (2013.01); *B01J 35/1014* (2013.01); *B01J 35/1038* (2013.01); *B01J 35/1042* (2013.01); *B01J 35/1061* (2013.01); *B01J 35/1066* (2013.01); *B01J 37/03* (2013.01); *B01J 37/031* (2013.01); *B01J 37/036* (2013.01); *B01J 37/04* (2013.01); *B01J 37/06* (2013.01); *B01J 37/08* (2013.01); *B01J 37/10* (2013.01); *C01F 17/32* (2020.01); *C01G 25/006* (2013.01); *B01D 2255/407* (2013.01); *B01J 23/20* (2013.01); *B01J 23/28* (2013.01); *B01J 23/30* (2013.01); *B01J 2523/00* (2013.01); *C01P 2002/52* (2013.01); *C01P 2002/60* (2013.01);
(Continued)

(58) Field of Classification Search
CPC ....... C01G 25/02; C01G 25/006; C01F 17/32; C01F 17/00; B01D 53/945; B01J 13/0021; B01J 13/0047; B01J 21/066; B01J 23/10; B01J 35/002; B01J 35/023; B01J 35/1014; B01J 35/1038; B01J 35/1042; B01J 35/1061; B01J 35/1066; B01J 37/03; B01J 37/031; B01J 37/036; B01J 37/04; B01J 37/06; B01J 37/08; B01J 37/10
See application file for complete search history.

(56) References Cited

U.S. PATENT DOCUMENTS 5,750,459 A   5/1998   Marella et al.
6,824,690 B1   11/2004   Zhao et al.
(Continued)

FOREIGN PATENT DOCUMENTS

CN   103191712 A   7/2013
CN   103191712 B   12/2014
(Continued)

OTHER PUBLICATIONS

Yamamoto et al. (Generation of Strong Acid Sites on Yttrium-Doped Tetragonal ZrO2-Supported Tungsten Oxides: Effects of Dopant Amounts on Acidity, Crystalline Phase, Kinds of Tungsten Species, and Their Dispersion, J Phys Chem C 2016, 120, 19705-19713). (Year: 2016).*

(Continued)

*Primary Examiner* — Colin W. Slifka
*Assistant Examiner* — Michael Forrest
(74) *Attorney, Agent, or Firm* — Praedcere Law

(57) ABSTRACT

This invention relates to azirconium hydroxideor zirconium oxide comprising, on an oxide basis, up to 30 wt % of a dopant comprising one or more of silicon, sulphate, phosphate, tungsten, niobium, aluminium, molybdenum, titanium or tin, and having acid sites, wherein the majority of the acid sites are Lewis acid sites. In addition, the invention relates to a catalyst, catalyst support or precursor, binder, functional binder, coating or sorbent comprising the zirconium hydroxide or zirconium oxide. The invention also relates to a process for preparing zirconium hydroxide, the process comprising the steps of:(a) dissolving a zirconium salt in an aqueous acid, (b) addingone or more complexing agents to the resulting solution or sol, the one or more complexing agents being an organic compound comprising at least one of the following functional groups: an amine, an organosulphate, a sulphonate, a hydroxyl, an ether or a carboxylic acid group, (c) heating the solution or sol formed in step (b), (d) adding a sulphating agent, and (e) adding a base to form a zirconium hydroxide, and (f) optionally adding a dopant.

19 Claims, 15 Drawing Sheets

Figure 1:
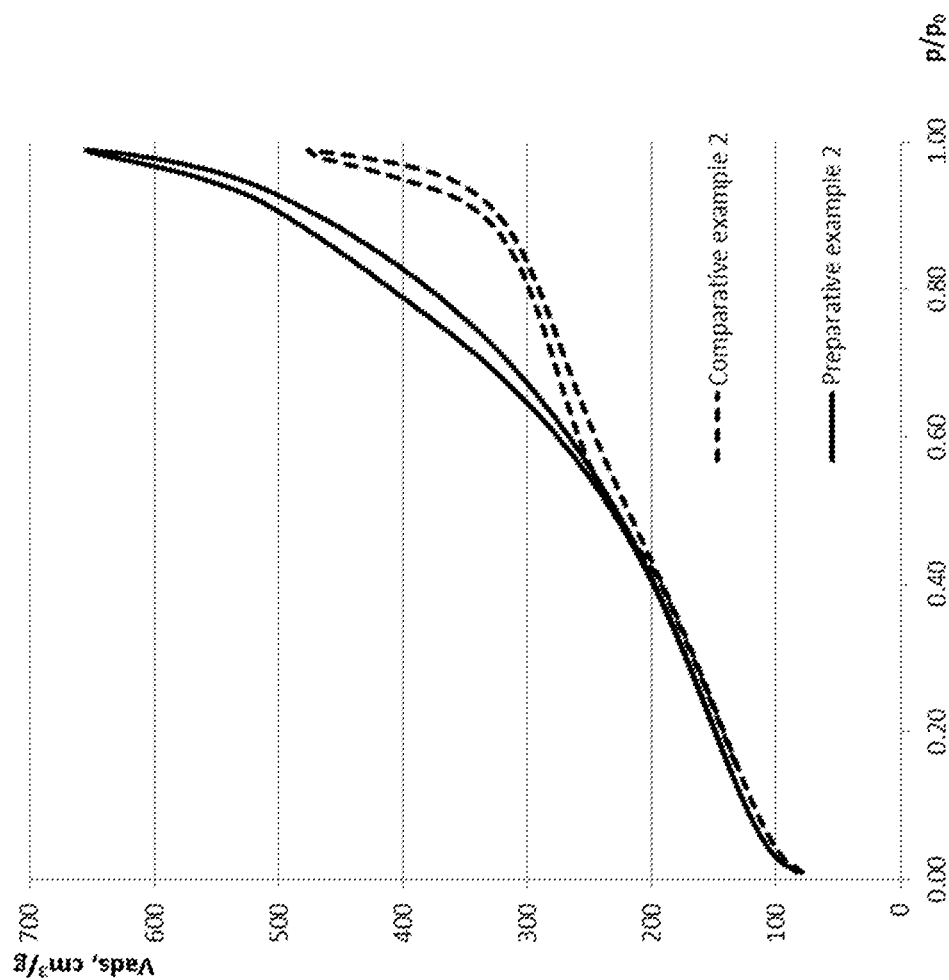

(51) Int. Cl.

| | | |
|---|---|---|
| *B01J 37/04* | (2006.01) | |
| *B01J 35/10* | (2006.01) | |
| *B01J 37/08* | (2006.01) | |
| *B01J 37/03* | (2006.01) | |
| *B01J 37/06* | (2006.01) | |
| *C01F 17/32* | (2020.01) | |
| *B01J 23/10* | (2006.01) | |
| *B01D 53/94* | (2006.01) | |
| *B01J 37/10* | (2006.01) | |
| *C01G 25/00* | (2006.01) | |
| *B01J 13/00* | (2006.01) | |
| *B01J 35/00* | (2006.01) | |
| *B01J 35/02* | (2006.01) | |
| *B01J 23/20* | (2006.01) | |
| *B01J 23/28* | (2006.01) | |
| *B01J 23/30* | (2006.01) | |

(52) U.S. Cl.
CPC ...... *C01P 2002/72* (2013.01); *C01P 2002/88* (2013.01); *C01P 2006/12* (2013.01); *C01P 2006/13* (2013.01); *C01P 2006/14* (2013.01); *C01P 2006/16* (2013.01); *C01P 2006/17* (2013.01)

(56) References Cited

U.S. PATENT DOCUMENTS

| | | | |
|---|---|---|---|
| 9,895,674 B1* | 2/2018 | Peterson | B01D 53/685 |
| 2003/0010679 A1* | 1/2003 | Watanabe | B01J 27/053 |
| | | | 208/213 |
| 2010/0247411 A1 | 9/2010 | Larcher et al. | |
| 2013/0212944 A1* | 8/2013 | Stephenson | B82Y 30/00 |
| | | | 48/111 |
| 2016/0151768 A1 | 6/2016 | Suib et al. | |
| 2016/0207027 A1 | 7/2016 | Kodama | |

FOREIGN PATENT DOCUMENTS

| | | | | |
|---|---|---|---|---|
| EP | 0409282 | A2 | 1/1991 | |
| JP | H03174325 | A | 7/1991 | |
| JP | H11-292538 | A | 10/1999 | |
| JP | 2000-247641 | A | 9/2000 | |
| JP | 2005082423 | A | 3/2005 | |
| JP | 2006036576 | A | 2/2006 | |
| JP | 2006143535 | A | 6/2006 | |
| JP | 2006199560 | A | 8/2006 | |
| JP | 2008285388 | A | 11/2008 | |
| JP | 2009525250 | A | 7/2009 | |
| JP | 2015143297 | A | 8/2015 | |
| JP | 2015189655 | A | 11/2015 | |
| JP | 5846322 | B2 | 1/2016 | |
| JP | 2016052988 | A | 4/2016 | |
| RU | 2337752 | C2 * | 11/2008 | B01J 21/063 |
| RU | 2426583 | C2 | 8/2011 | |
| RU | 2551495 | C2 | 5/2015 | |
| SU | 867880 | A1 | 9/1981 | |
| WO | WO2004/096713 | A1 | 11/2004 | |
| WO | WO2007/088326 | A1 | 8/2007 | |
| WO | WO2010122014 | A1 | 10/2010 | |
| WO | WO 2014/089131 | A1 | 6/2014 | |

OTHER PUBLICATIONS

Glover et al. (Adsorption of Ammonia by Sulfuric Acid Treated Zirconium Hydroxide, Langmuir, 2012, 28, 10478-10487) (Year: 2012).*
Mercera et al. (Zirconia as a support for catalysts Influence of additives on the thermal stability of the porous texture of monoclinic zirconia, Appl Cata, 71 (1991) 363-391) (Year: 1991).*
Pokrovski et al. (Investigation of CO and CO2 Adsorption on Tetragonal and Monoclinic Zirconia, Langmuir, 2001, 17, 4297-4303) (Year: 2001).*
Machine Translation of RU-2337752 generated on Dec. 23, 2022 (Year: 2022).*
Santiesteban et al (Influence of the Preparative Method on the Activity of Highly Acidic WOx/ZrO2 and the Relative Acid Activity Comparted with Zeolites, J Cata 168, (1997) 431-441). (Year: 1997).*
International Search Report & Written Opinion of PCT/GB2017/050233, dated Aug. 4, 2017, 28 pages.
Chuah G K et al: "Cyclisation of 1-4,31 Citronellal to Isopulegol Catalysed by Hydrous Zirconia and Other Solid Acids", Journal of Catalysis, Academic Press, Duluth, MN, US, vol. 200, No. 2, Jun. 10, 2001 (Jun. 10, 2001), pp. 352-359.
Reddy B M et al: "Influence of alumina and titania on the structure and catalytic properties of sulfated zirconia: Beckmann rearrangement", Journal of Molecular Catalysis A: Chemical, Elsevier, Amsterdam, NL, vol. 306, No. 1-2, Jul. 1, 2009 (Jun. 1, 2009), pp. 62-68.
Jadhav S V et al: "Synthesis of nopol via Prins condensation of @b pinene and paraformaldehyde catalyzed by sulfated zirconia", Applied Catalysis A: General, Elsevier, Amsterdam, NL, vol. 390, No. 1-2, Dec. 20, 2010 (Dec. 20, 2010), pp. 158-165.
Devulapelli V G et al: "Esterification of 4-methoxyphenylacetic acid with dimethyl carbonate over mesoporous sulfated zirconia", Catalysis Communications, Elsevier, Amsterdam, NL, vol. 10, No. 13, Jul. 25, 2009 (Jul. 25, 2009), pp. 1711-1717.
Shimizu K et al, "NMR study of tungstated zirconia catalyst: acidic properties of tungstated zirconia and influence of tungsten loading", Applied Catalysis A: General, Elsevier, Amsterdam, NL, vol. 224, No. 1-2, Jan. 25, 2002 (Jan. 25, 2002), pp. 77-87.
Anderson et al: "Influence of Si/Zr ratio on the formation of surface acidity in silica-zirconia aerogels", Journal of Cataly, Academic Press, Duluth, MN, US, vol. 192, No. 2, Jun. 10, 2000 (Jun. 10, 2000), pp. 344-354.
Su et al, Strong adsorption of phosphate by amorphous zirconium oxide nanoparticles, Water Research, 2013;47 (14):5018-26.
Huang et al, Catalytic Hydrogenation of CO2 to Methanol: Study of Synergistic Effect on Adsorption Properties of CO2 and H2 in CuO/ZnO/ZrO2 System , Catalysts 2015, 5, 1846-1861; doi:10.3390/catal5041846.
Porosoff et al, Catalytic reduction of CO2 by H2 for synthesis of CO, methanol and hydrocarbons: challenges and opportunities, Energy Environ. Sci., 2016,9, 62-73.
Larsen, et al. Alcohol Dehydration Reactions over Tungstated Zirconia Catalysts , Journal of Catalysis, V. 169, Issue 1, Jul. 1, 1997, pp. 67-75.
Ecormier et al, Structure-reactivity correlations in sulphated-zirconia catalysts for the isomerisation of α-pinene, Journal of Catalysis 215 (2003) 57-65.
Yadav, et al. Sulfated zirconia and its modified versions as promising catalysts for industrial processes, Microporous and Mesoporous Materials, V. 33, Issues 1-3, 15 1999, p. 1-48.
Fuentes-Perujo et al, Evaluation of the acid properties of porous zirconium-doped and undoped silica materials, Journal of Solid State Chemistry V. 179, Issue 7, 2006, p. 2182-2189.
Stevens et al, In situ infrared study of pyridine adsorption/desorption dynamics over sulfated zirconia and Pt-promoted sulfated zirconia, Applied Catalysis A:General, 2003, 252, 57-74.
Hadjiivanov et al., Combined TPD and FTIR studies of Co/ZrO2 catalysts: determination of the cobalt dispersion, Surface and Intersurface analysis, V.34., Issue1, 2002, p. 88-91.
Wang et al, "Preparation, characterization and application of ordered mesoporous sulfated zirconia", Research on Chemical Intermediates, 2019, vol. 45, pp. 1073-1086.
Yuan et al, "Surface characterization of sulfated zirconia and its catalytic activity for epoxidation reaction of castor oil", Chemical Engineering Communications, 2019, pp. 1618-1627 , https://doi.org/10.1080/00986445.2018.1560274.
Yi et al, "Synthesis and characterization of thermally stable mesostructured sulfated zirconia by a novel sulfate-assisted alcohothermal route", Catalysis Letters, 2005, vol. 99 (Nos. 1-2), pp. 73-78.
Search report issued for Russian patent application 2019108783 dated Jul. 13, 2020, 3 pages.

(56) References Cited

OTHER PUBLICATIONS

Office Action issued by the Japanese Patent Office for Japanese patent application 2019-516706 dated Oct. 27, 2020, 8 pages (Translation in English is provided).
Search Report issued by the Japanese Patent Office for Japanese patent application 2019-516706 dated Oct. 19, 2020, 45 pages (provided in English).
Yamamoto et al., "Generation of Strong Acid Sites on Yttrium-Doped Tetragonal ZrO2-Supported Tungsten Oxides: Effects of Dopant Amounts on Acidity, Crystalline Phase, Kinds of Tungsten Species, and Their Dispersion", JPhys Chem C 2016, US, American Chemical Society, Aug. 16, 2016, vol. 120, pp. 19705-19713.
Office Action issued by the Chinese National Intellectual Property Administration for Chinese patent application 201780065346.1 dated Feb. 3, 2021, 27 pages (Translation in English is provided).
Shiju et al., "Tungstated Zirconia Catalysts for Liquid-Phase Beckmann Rearrangement of Cyclohexanone Oxime: Structure-Activity Relationship", Journal of Physical Chemistry, 2009, vol. 113 No. 18, pp. 7735-7742.

\* cited by examiner

ACIDIC ZIRCONIUM HYDROXIDE

This invention relates to processes for preparing acidic zirconium hydroxides and oxides, compositions comprising acidic zirconium hydroxides and oxides, as well as the use of these hydroxides and oxides in catalysis and sorption applications.

BACKGROUND

Due to its well-known amphoteric properties, zirconium hydroxide has a strong ability for selective adsorption of wide range of different toxic anions, such as phosphates and arsenates.

Zirconium oxides, both with and without stabilisers, find applications in many different types of catalysis, including environmental, automotive and chemical catalysis applications. The catalytic activity of $ZrO_2$ in important reactions such as methanol and hydrocarbon synthesis from CO and $H_2$, $CO_2$ and $H_2$, or alcohol dehydration, has also been studied.

Zirconium hydroxide has also been extensively used as a support for metals. It has also been incorporated in supports in order to stabilize the metal or make the metal more resistant to sintering. Stabilised zirconium hydroxide, containing sulfate or tungstate ions, has been found to exhibit a superacidic behaviour leading to a high activity for isomerization of hydrocarbons or for conversion of methanol into hydrocarbons. Silicon substitution into zirconium hydroxide has been found to enhance the acidity of the mixed oxide produced from the hydroxide. The resulting materials possess good catalytic activity at high temperatures and are currently being tested as promising methane oxidation catalysts for liquefied natural gas (LNG) fuelled engines. In relation to this area of technology, references to the elemental forms of the various dopants are generally interpreted to include their corresponding oxides. Thus, for example, silicon includes silicate and colloidal silica, tungsten includes tungstate etc.

The commercial success of zirconium hydroxide materials in catalysis is mainly due to the ability to modify their physical and chemical properties by subtle processing methods and incorporation of other stabilisers. This allows fine-tuning the critical parameters of a catalyst support. Different combinations of properties are required for different applications, but having high, thermally stable, surface areas and porosities are pre-requisites for most catalyst applications. Through modification of the manufacturing process to improve the morphology of the product, changes in the balance of acid-base properties will also be observed. These properties can also be significantly impacted by inclusion of dopants such as silica, aluminium, sulphate, phosphate, molybdenum, tin, tungsten, niobium and titanium.

Thus, it is clear that porosity is an important, but not critical, criterion for effective catalyst behaviour. An equally prominent role in final catalytic performance is played by surface acidity, which in zirconium hydroxide for example is impacted by the amount and ratio of terminal and bridging OH groups. This means that determination of the strength of acid sites, as well as their concentration and type (Bronsted/Lewis), is important in assessing the suitability of a catalyst for a particular application. Many different techniques are used for characterising solid surface acid properties, including visual colour changes; spectrophotometry; and amines titration etc.

The adsorption of gaseous bases, particularly pyridine, coupled with infrared (IR) analysis has been accepted as a general practice to qualify the types of acid on the surface. There are two main reasons for this. Firstly, it helps to evaluate the total concentration of acid sites on catalyst surface because the amount of base adsorbed from the gaseous phase strongly correlates with the concentration of acid sites on the solid surface. Secondly, different IR adsorption bands corresponding to formation of different complexes let to distinguish the nature of active sites on zirconia surface.

Temperature-Programmed Desorption (TPD) is another well-known technique widely used for characterization of acid/basic sites on oxide surfaces. TPD can help to determine the quantity and strength of the active sites on a zirconium hydroxide, which is crucial for understanding and predicting the performance of the catalyst.

Properties of zirconium hydroxides and oxides often strongly depend on method of preparation. WO2004/096713 describes a method for the production of zirconium oxides and zirconium-based mixed oxides. The process involves the precipitation of zirconium hydroxide from an aqueous solution of zirconium salt by reaction with an alkali in the presence of a controlled amount of sulphate anions at a temperature of not greater than 50° C. The hydroxide is then calcined to form an essentially sulphate-free zirconium oxide. Japanese patent application publication nos. H11-292538 and 2000-247641 describe the manufacture of zirconium hydroxide from a zirconium basic sulphate by the addition of base to a slurry of the sulphate. However, the processes set out in these documents do not result in zirconium hydroxide having the improved pore volume, pore size and surface area properties of the present invention.

Improved porosity properties of an amorphous zirconium hydroxide and a method for its production were described in WO2007/088326. The hydroxide has a surface area of at least 300 $m^2/g$, a total pore volume of at least 0.70 $cm^3/g$ and an average pore size 5 nm-15 nm. It is prepared by a process which comprises the steps of: a) preparing an aqueous solution comprising sulphate anions and a zirconium salt at a specific ratio, (b) chilling the solution to below 25° C., (c) adding an alkali in order to precipitate the amorphous zirconium hydroxide, (d) filtering and washing the precipitated zirconium hydroxide with water or an alkali to remove residual sulphate and chloride, (e) hydrothermally treating the zirconium hydroxide at a pressure of less than 3 barg, and (f) drying the zirconium hydroxide.

Despite the improved porosity characteristics of the amorphous material described in WO2007/088326, improvements in thermostability of calcined materials, design of tailored porous/crystalline structures (including the possibility of creating certain size of pores, and phase content) and specific surface (acid/base) properties have been sought.

STATEMENT OF INVENTION

According to the invention there are provided zirconium hydroxides or zirconium oxides as defined in the aspects of the invention set out below. In relation to all of the aspects of the invention, the zirconium hydroxides or zirconium oxides may be defined as acidic. The majority of the acid sites of the zirconium hydroxides and zirconium oxides may also be Lewis acid sites. This may be shown by the highest intensity peaks in the DRIFT spectra of the zirconium hydroxides in the range 1700-1400 $cm^{-1}$ being at around 1600-1620 $cm^{-1}$ and around 1440-1450 $cm^{-1}$. More particularly, the zirconium hydroxides and zirconium oxides may have more Lewis acid sites than Brnsted acid sites. This may be shown by the peaks in the DRIFT spectra of the zirconium hydroxides at around 1600-1620 cm$^{-1}$ and around 1440-1450 cm$^{-1}$ being higher than those at around 1630-1640 cm$^{-1}$ and around 1530-1550 cm$^{-1}$. In the context of the invention, the term "acid sites" is used to refer to acid species that are available for reaction. They can include Brnsted acid sites i.e. proton donors (eg the proton on terminal surface OH groups, SO$_3$H groups or other surface groups) and Lewis acid sites i.e electron acceptors (eg Zr atoms). The zirconium oxide or zirconium hydroxide may comprise, on an oxide basis, up to 30 wt %, more particularly up to 16 wt %, of a dopant comprising one or more of silicon, sulphate, phosphate, tungsten, niobium, aluminium, molybdenum, titanium or tin. It is noted that all zirconium oxides and zirconium hydroxides comprise, on an oxide basis, around 1.5-2 wt % hafnium oxide or hydroxide as an impurity. This is not included in the amounts of "incidental impurities" referred to below.

According to one aspect of the invention, there is provided a zirconium hydroxide comprising, on an oxide basis, less than 0.1 wt % of a dopant comprising one or more of silicon, sulphate, phosphate, tungsten, niobium, aluminium, molybdenum, titanium or tin, wherein the zirconium hydroxide is porous and, in relation to the pores having a pore diameter of up to 155 nm, at least 70% of its pore volume provided by pores having a pore diameter of 3.5-155 nm as measured using the BJH method. In particular, the zirconium hydroxide may comprise, on an oxide basis, less than 0.1 wt % of a dopant comprising one or more of silicon, sulphate, phosphate, tungsten, niobium, aluminium, molybdenum, titanium, tin, a rare earth metal, or yttrium. More particularly, in relation to the pores having a pore diameter of up to 155 nm, at least 75% of its pore volume may be provided by pores having a pore diameter of 3.5-155 nm as measured using the BJH method. In particular, in relation to the pores having a pore diameter of up to 155 nm, less than 30% of its pore volume may be provided by pores having a pore diameter of less than 3.5 nm as measured using the BJH method, more particularly less than 25%. In the context of the invention, a pore diameter of 3.5-155 nm is defined as mesoporous/macroporous, and a pore diameter of less than 3.5 nm as microporous.

In particular, the zirconium hydroxide may have a total pore volume as measured by N$_2$ physisorption of at least 0.75 cm$^3$/g, more particularly at least 0.80 cm$^3$/g. In particular, the zirconium hydroxide may have a mean pore diameter of at least 6.0 nm, more particularly at least 6.5 nm.

In particular, the zirconium oxide may comprise at least 80 wt % of the monoclinic phase as measured by XRD (X-Ray Diffraction) after calcination at 450° C. in an air atmosphere for 2 hours, more particularly at least 82 wt %.

In particular, the zirconium hydroxide may have an acid loading of at least 1300 µmol/g as measured by propylamine TPD. More particularly, the zirconium hydroxide may have T$_{max}$ of less than 365° C., even more particularly less than 360° C., as measured by propylamine TPD.

This aspect of the invention also relates to zirconium oxides which are obtained or obtainable from the zirconium hydroxides defined above, generally by calcination (for example, at a temperature of 450° C. or higher). More particularly, there is provided a zirconium oxide comprising, on an oxide basis, less than 0.1 wt % of a dopant comprising one or more of silicon, sulphate, phosphate, tungsten, niobium, aluminium, molybdenum, titanium or tin, having a surface area of at least 50 m$^2$/g after calcination at 600° C. in an air atmosphere for 2 hours, even more particularly at least 52 m$^2$/g. More particularly, the zirconium oxide may comprise, on an oxide basis, less than 0.1 wt % of a dopant comprising one or more of silicon, sulphate, phosphate, tungsten, niobium, aluminium, molybdenum, titanium, tin, a rare earth metal, or yttrium. In particular, the zirconium oxide may have an acid loading of at least 100 µmol/g as measured by propylamine TPD after calcination at 600° C. in an air atmosphere for 2 hours. More particularly, the zirconium oxide may have a total pore volume as measured by N$_2$ physisorption of at least 0.35 cm$^3$/g after calcination at 600° C. in an air atmosphere for 2 hours. In particular, the zirconium oxide may have a mean pore diameter of at least 25.0 nm after calcination at 600° C. in an air atmosphere for 2 hours. More particularly, the zirconium oxide may show basicity, characterised by a CO$_2$ uptake of at least 14 µmol/g at 400-600° C. as measured by TPD (Temperature Programmed Desorption), even more particularly at least 16 µmol/g, after calcination at 600° C. in an air atmosphere for 2 hours.

In addition, this aspect of the invention also relates to a zirconium oxide comprising, on an oxide basis, less than 0.1 wt % of a dopant comprising one or more of silicon, sulphate, phosphate, tungsten, niobium, aluminium, molybdenum, titanium or tin, having a surface area of at least 15 m$^2$/g after calcination at 900° C. in an air atmosphere for 2 hours, even more particularly at least 16 m$^2$/g. In particular, the zirconium oxide may have a total pore volume as measured by N$_2$ physisorption of at least 0.10 cm$^3$/g after calcination at 900° C. in an air atmosphere for 2 hours. More particularly, the zirconium oxide may have a mean pore diameter of at least 26.0 nm after calcination at 900° C. in an air atmosphere for 2 hours More particularly, the zirconium hydroxide or zirconium oxide may be, on an oxide basis, at least 98 wt % pure, even more particularly at least 99 wt % pure (excluding the hafnium oxide or hydroxide impurity mentioned above).

The zirconium hydroxides, or corresponding calcined oxides, also exhibit useful physical characteristics such as high pore volumes, particular relating to pore size in the range 3.5-50 nm. In addition, they may show a nitrogen isotherm of type IV hysteresis loop of H3 with mesoporosity at P/PO>0.6.

According to a second aspect of the invention, there is provided a doped zirconium oxide comprising, on an oxide basis, 0.1-30 wt % of a silicon hydroxide or oxide, wherein the zirconium oxide has an NH$_3$ uptake of at least 3.5 µmol/m$^2$ as measured by TPD, after calcination at 850° C. for 2 hours. More particularly, the silicon doped zirconium oxide may have an NH$_3$ uptake of at least 4.0 µmol/m$^2$ as measured by TPD, even more particularly at least 4.25 µmol/m$^2$, after calcination at 850° C. in an air atmosphere for 2 hours. In particular, the silicon doped zirconium oxide may have an NH$_3$ uptake of at least 330 µmol/g as measured by TPD, more particularly at least 360 µmol/g, after calcination at 850° C. in an air atmosphere for 2 hours. In particular, the silicon doped zirconium oxide may have T$_{max}$ of at least 280° C. as measured by NH$_3$ TPD, more particularly at least 285° C., after calcination at 850° C. in an air atmosphere for 2 hours. As noted above, this oxide may be obtained or obtainable from the corresponding zirconium hydroxide, generally by calcination (for example, at a temperature of 450° C. or higher).

In particular, the silicon doped zirconium oxide may have an acid loading of at least 170 µmol/g as measured by propylamine TPD after calcination at 850° C. in an air atmosphere for 2 hours.

In addition, this aspect of the invention also relates to a silicon doped zirconium hydroxide having a surface area of at least 540 m$^2$/g, a total pore volume as measured by N$_2$ physisorption of at least 0.90 cm$^3$/g, and when calcined at 850° C. in an air atmosphere for 2 hours an NH$_3$ uptake of at least 3.5 μmol/m$^2$ as measured by TPD.

More particularly, the silicon doped zirconium hydroxide or silicon doped zirconium oxide may comprise, on an oxide basis, 1-10 wt % of a silicon hydroxide or oxide, even more particularly 1-5 wt %, more particularly 2.5-4.5 wt %. In particular, the remainder of the silicon doped zirconium oxide may comprise, on an oxide basis, zirconium oxide and incidental impurities up to 0.3 wt %

According to a third aspect of the invention, there is provided a doped zirconium hydroxide comprising, on an oxide basis, 0.1-30 wt % of a tungsten hydroxide or oxide having a surface area of at least 400 m$^2$/g. More particularly, the tungsten doped zirconium hydroxide may have a surface area of at least 450 m$^2$/g, even more particularly at least 500 m$^2$/g.

In particular, the tungsten doped zirconium hydroxide may have a total pore volume as measured by N$_2$ physisorption of at least 0.7 cm$^3$/g, more particularly at least 0.8 cm$^3$/g.

In particular, this aspect of the invention also relates to tungsten doped zirconium oxides which are obtained or obtainable from the tungsten doped zirconium hydroxides defined above, generally by calcination (for example, at a temperature of 450° C. or higher). More particularly, there is provided a tungsten doped zirconium oxide comprising, on an oxide basis, 0.1-30 wt % of a tungsten hydroxide or oxide having an NH$_3$ uptake of at least 4.30 μmol/m$^2$ as measured by TPD after calcination at 700° C. in an air atmosphere for 2 hours. More particularly, the tungsten doped zirconium oxide may have an NH$_3$ uptake of at least 420 μmol/g as measured by TPD, even more particularly at least 460 μmol/g, after calcination at 700° C. in an air atmosphere for 2 hours.

In particular, the tungsten doped zirconium oxide may have an acid loading of at least 260μmol/g, more particularly at least 280 μmol/g, as measured by propylamine TPD after calcination at 700° C. in an air atmosphere for 2 hours.

More particularly, the tungsten doped zirconium hydroxide or tungsten doped zirconium oxide may comprise, on an oxide basis, 12-20 wt % of a tungsten hydroxide or oxide, even more particularly 14-18 wt %. In particular, the remainder of the tungsten doped zirconium oxide may comprise, on an oxide basis, zirconium oxide and incidental impurities up to 0.3 wt %.

According to a fourth aspect of the invention, there is provided a doped zirconium hydroxide comprising, on an oxide basis, 0.1-30 wt % of a sulphate, more particularly 1-12 wt %, even more particularly 1-10 wt %, having a surface area of at least 375 m$^2$/g. More particularly, the sulphate doped zirconium hydroxide may have a surface area of at least 400 m$^2$/g.

In particular, the sulphate doped zirconium hydroxide may have a total pore volume as measured by N$_2$ physisorption of at least 0.50 cm$^3$/g, more particularly at least 0.60 cm$^3$/g. In particular, the sulphate doped zirconium hydroxide may have a mean pore diameter of at least 5.5 nm, more particularly at least 6.0 nm.

In particular, this aspect of the invention also relates to sulphate doped zirconium oxides which are obtained or obtainable from the sulphate doped zirconium hydroxides defined above, generally by calcination (for example, at a temperature of 450° C. or higher). More particularly, there is provided a sulphate doped zirconium oxide comprising, on an oxide basis, 0.1-30 wt % of a sulphate having an NH$_3$ uptake of at least 800 μmol/g as measured by TPD, more particularly at least 850 μmol/g, even more particularly at least 900 μmol/g, after calcination at 600° C. in an air atmosphere for 2 hours. In particular, the sulphate doped zirconium oxide may comprise, on an oxide basis, 1-12 wt % of a sulphate, more particularly 1-10 wt %.

In particular, the sulphate doped zirconium oxide may have an acid loading of at least 800 μmol/g, more particularly at least 900 μmol/g, as measured by propylamine TPD after calcination at 600° C. in an air atmosphere for 2 hours.

More particularly, the sulphate doped zirconium oxide may have a surface area of at least 140 m$^2$/g after calcination at 600° C. in an air atmosphere for 2 hours, even more particularly at least 150 m$^2$/g. In particular, the zirconium oxide may have a total pore volume as measured by N$_2$ physisorption of at least 0.30 cm$^3$/g after calcination at 600° C. in an air atmosphere for 2 hours, more particularly at least 0.32 cm$^3$/g. More particularly, the zirconium oxide may have a mean pore diameter of at least 8.5 nm, even more particularly at least 9.0 nm, after calcination at 600° C. in an air atmosphere for 2 hours.

This invention relates to acidic zirconium hydroxides and acidic zirconium oxides with controlled acidic and basic properties, both in the bulk and on the surface.

In some embodiments, the silicon, tungsten, sulphate, phosphate, niobium, aluminium, molybdenum, titanium or tin doped zirconium hydroxide or oxide may comprise an additional dopant, specifically to help stabilise the bulk form. The additional dopant may comprise a rare earth hydroxide or oxide, or yttrium hydroxide or oxide, or any other transition metal hydroxide or oxide not already mentioned. This further dopant may be present in a concentration, on an oxide basis, of less than 25 wt %, more particularly 0.1-25 wt %. In particular, the total zirconium content of the zirconium hydroxide or zirconium oxide will not be less than 50 wt % on an oxide basis. In some embodiments, the zirconium hydroxides of the invention comprise less than 5% by weight cerium hydroxide, more particularly less than 2% by weight cerium hydroxide, even more particularly less than 1% by weight cerium hydroxide. In some embodiments, the zirconium hydroxides are substantially free of cerium.

As noted above, the zirconium hydroxide, or further stabilised or doped zirconium hydroxides, can be calcined to their corresponding oxides. These oxides also exhibit acidic characteristics, but some may also show strong basicity. The temperature at which this calcination is carried out depends on the dopant which has been added to the composition. For some dopants, too high a temperature will result in loss of that dopant from the composition. For example, for compositions comprising sulphate, the calcination temperature should be less than 650° C., more particularly 400-650° C. For compositions comprising tungsten, the calcination temperature should be less than 850° C., more particularly 400-800° C. For other compositions, the calcination temperature may be 400-1000° C., more particularly 450-800° C.

In particular, the zirconium hydroxides may be substantially amorphous as measured by XRD. More particularly, the zirconium hydroxides may have a d$_{50}$ particle size as measured by laser light scattering of less than 100μm, more particularly 10-50μm.

To be useful in catalysis or sorption applications, the compositions defined herein may comprise less than 250 ppm of Na and/or less than 250 ppm of K, more particularly less than 200 ppm, even more particularly less than 125 ppm. In some embodiments, the content of Na and/or K may be less than 50 ppm.

According to a fifth aspect of the invention, there is provided a catalyst, catalyst support or sorbent comprising any one of the zirconium hydroxides and/or zirconium oxides described above.

According to a further aspect of the invention there is provided a process for preparing zirconium hydroxide, the process comprising the steps of:

(a) dissolving a zirconium salt in an aqueous acid,
(b) adding one or more complexing agents to the resulting solution or sol, the one or more complexing agents being an organic compound comprising at least one of the following functional groups: an amine, an organosulphate, a sulphonate, a hydroxyl, an ether or a carboxylic acid group,
(c) heating the solution or sol formed in step (b),
(d) adding a sulphating agent,
(e) adding a base to form a zirconium hydroxide, and
(f) optionally adding a dopant.

When zirconium hydroxides, optionally including a dopant, are produced by this process, the resulting materials having a higher percentage of mesopores than has previously been achieved. In addition, improved thermostability can be achieved, particularly for undoped zirconium hydroxides calcined at 900° C. The undoped zirconium hydroxides can also exhibit a higher percentage of the monoclinic phase.

In some embodiments, the zirconium salt may be zirconium basic carbonate or zirconium hydroxide. In certain embodiments, zirconium basic carbonate (ZBC) is preferred because it dissolves easily in mineral acids, is commercially available, and the carbonate anions produced are fugitive and so they don't take part of complicated subsequent reactions. Some alternative anions may not be environmentally favourable. In some embodiments, the aqueous acid may be hydrochloric acid, sulphuric acid, nitric acid or acetic acid, in particular the aqueous acid is nitric acid. Without wishing to be bound to any theory, although other acids may be used it is thought that the nitrate ions provided by nitric acid coordinate particularly well with the zirconium ions in the aqueous solution.

In particular, in step (a) the molar ratio of zirconium ions to nitrate ions in the solution or sol may be 1:0.8 to 1:2, more particularly 1:0.8 to 1:1.5.

In the context of the invention, the term complexing agent is used to mean a ligand that bonds to zirconium. In some embodiments, in step (b) the complexing agent may be a carboxylic acid, a dicarboxylic acid, an alpha hydroxycarboxylic acid, an amino acid, an organosulphate or a polyol. In particular, the complexing agent may be a multidentate, more particularly a bidentate, ligand. The polyol may be a polysaccharide, for example starch. In particular, the complexing agent may be an alpha hydroxycarboxylic acid. The complexing agent generally has a polar group (ie an amine, an organosulphate, a sulphonate, a hydroxyl, an ether or a carboxylic acid group) which coordinates to zirconium, and one or more hydrocarbon groups. In some embodiments, the one or more hydrocarbon groups may comprise one or more aromatic substituents, more particularly one or more phenyl substituents. Without wishing to be bound to any theory, multidentate ligands coordinate effectively to metal ions. The combination of different functional groups within the same molecule may be advantageous to interact with different coordination environments on the metal ion; providing both steric and electronic effects. Thus, depending upon the nature of the pore size and pore network, complexing agents with different hydrocarbon groups may be used. For example, the alpha hydroxy carboxylic acid may be an aromatic (for example, phenyl) or non-aromatic alpha hydroxycarboxylic acid, more particularly mandelic or benzillic or lactic acid even more particularly mandelic acid.

In particular, in step (a) the solution formed may be heated. In particular, the solution may be heated to a temperature above 25° C., more particularly to at least 40° C., even more particularly at least 50° C., more particularly to a temperature in the range 50-70° C. More particularly, the solution may be heated to around 60° C.

Optionally, in step (a) the pH of the solution may be increased (i.e., partially neutralised) by adding a base. This increase in pH can also be described as a reduction in free acidity. In particular, the pH increase may be carried out prior to heating the solution. More particularly, the base may be sodium hydroxide, sodium carbonate, sodium hydrogen carbonate, ammonium hydroxide, ammonium carbonate, ammonium hydrogen carbonate, potassium hydroxide, potassium carbonate, and/or potassium hydrogen carbonate.

In particular, step (b) may additionally comprise adding water, normally deionised water, to the heated solution. More particularly, in step (b), after the addition of the complexing agent, the solution has an equivalent zirconium content of 5-25% by weight expressed as $ZrO_2$, more particularly 10-20% by weight, even more particularly 12-16% by weight, expressed as $ZrO_2$. The equivalent zirconium content expressed as $ZrO_2$ means that, for example, 100 g of a 15% by weight solution would have the same zirconium content as 15 g of $ZrO_2$.

More particularly, in step (c) the heating may comprise heating the solution or sol to a temperature of 60-100° C., more particularly 80-100° C., for 1-15 hours. In particular, the heating may be carried out for 1-5 hours. More particularly, in step (c) the temperature of the solution or sol may be increased at a rate of 0.1-1.5° C./min. In the context of this invention, references to a heating rate including both linear (ie constant) heating rates, as well as non-linear heating rates (eg a fast initial heating rate, followed by a slower heating rate). This heating step is normally carried out in order to assist in providing optimum polymer/oligomer size for mesoporous powder preparation.

In particular, in step (d) the solution or sol may be allowed to cool, or cooled, before adding the sulphating agent. More particularly, the solution or sol may be allowed to cool, or cooled, to a temperature less than 40° C., even more particularly less than 30° C. Possible sulphating agents are water soluble salts of sulphate, bisulphate, sulphite, bisulphite. In particular, the sulphating agent may be sulphuric acid. The sulphating agent may be added such that the molar ratio of zirconium ions to sulphate ions is from 1:0.05 to 1:1 After the sulphate addition in step (d), the process may comprise the step of isolating the solid from the solution or sol, for example by filtering.

In step (e), the pH of the solution or sol may be increased to pH>8 by adding the base. The base may be sodium hydroxide, sodium carbonate, sodium hydrogen carbonate, ammonium hydroxide, ammonium carbonate, ammonium hydrogen carbonate, potassium hydroxide, potassium carbonate and/or potassium hydrogen carbonate. More particularly, in step (e) the addition of the base is to form a zirconium hydroxide precipitate. The pH that the solution or sol can be adjusted to depends on the base used. In particular, the base may be either ammonium hydroxide or an alkali metal hydroxide, more particularly sodium hydroxide. For ammonium hydroxide, the maximum pH that can be achieved is normally about pH 10.5-11. For alkali metal hydroxides, the pH can be adjusted to pH 11-13 or higher.

Step (e) may be carried out at any temperature at which the solution or sol is not frozen, ie from −5° C. to 95° C., more particularly, 10° C. to 80° C.

In some embodiments, the process may comprise after step (e) the step of (f) adding a dopant. This is a novel feature of the method of the invention in that the dopants are added after step (e) rather than being co-precipitated with the zirconium hydroxide in step (e). In particular, the dopant may be any material which stabilises the tetragonal phase of zirconia, for example as a surface stabiliser or bulk stabiliser. This phase of zirconia can provide improved catalytic performance. The dopant can also be used to increase the acidity of the material. More particularly, the dopant may comprise one or more of silicon, sulphate, phosphate, tungsten, niobium, aluminium, molybdenum, titanium or tin. Even more particularly, the dopant may comprise one or more of sulphate, silicon or tungsten. Sulphate may be added in the form of sulphuric acid, ammonium sulphate, sodium sulphate or other sulphate salt; silicon may be added in the form of silica, such as aqueous colloidal silica or sodium silicate; and tungsten may be added in the form of a tungstate salt such as sodium tungstate or ammonium metatungstate. Step (f) may be carried out at any point in the process after step (e) and before the drying step mentioned below.

In some embodiments, the process may comprise after step (e), and before or after step (f), the step of (g) heat treating the zirconium hydroxide. The heat treatment may be hydrothermal treatment. The hydrothermal treatment may comprise heating the solution or sol to a temperature of 50-250° C., more particularly 100-250° C., for 0.5-24 hours in an autoclave.

More particularly, between steps (e) and (g) and/or after step (g), and before or after step (f), the process may comprise the steps of isolating, for example by filtering, and/or washing the zirconium hydroxide. These steps may be carried out to remove chloride ions, sulphate ions, phosphate ions, nitrate ions, acetate ions, sodium ions, potassium ions, ammonium ions and/or organic residue if desired. For compositions where sulphate or phosphate is not added as the dopant, levels of sulphate or phosphate ions may be reduced to 0.3% by weight or less, more particularly 0.1% by weight or less. Levels of sodium, potassium and chloride ions may be reduced to 0.05% by weight or less each, more particularly 0.01% by weight of less each, even more particularly 0.005% by weight or less each.

Alkali metal ions may then be removed by an additional step of reslurrying the washed zirconium hydroxide and adding a mineral acid. In particular, the mineral acid may be nitric acid or sulphuric acid, more particularly nitric acid. The nitric acid concentration may be from about 10% to 60% by weight. The pH of the solution is generally adjusted to a pH less than 9, preferably adjusted to between pH 6.5-9. After an optional further filtration step the process may comprise the optional step of redispersing the precipitate in an aqueous medium and heating the resulting dispersed slurry or wet cake to between 100° C. and 350° C., more particularly between 100° C. to 200° C. This can, for example, be in a sealed reaction vessel such as an autoclave, or up to 100° C. in an open vessel.

In some embodiments, the process may comprise after step (e), or after steps (f) or (g) if they are carried out, the step of (h) drying the zirconium hydroxide. In particular, this may be by oven-drying, spray-drying or vacuum-drying. Drying may be carried out in an oxidising, inert (eg $N_2$) or reducing atmosphere. More particularly, the zirconium hydroxide may be dried at a temperature of 50-200° C. If a vacuum is used, the drying temperature can be at the lower end of this range. Without a vacuum, temperatures at the higher end of this range may be required, for example 100-150° C.

In some embodiments, the process may comprise after step (g), or after step (e) or (f) if step (f) and/or (g) is not carried out, the step of (h) calcining the zirconium hydroxide to form a zirconium oxide. More particularly, the calcining step may be carried out at temperature of 400-1100° C., even more particularly 600-850° C. The calcining step may be carried out for 0.5-15 hours, more particularly 2-8 hours, even more particularly 2-3 hours. The calcining step may be carried out in any gaseous atmosphere. In particular, the calcining step may be carried out in a static or flowing air atmosphere, although a reductive or neutral atmosphere could be used. In the process of the invention, an air atmosphere is generally preferred since this can assist in removing organic species. A neutral atmosphere is generally defined as one which neither oxidises nor reduces the composition in that atmosphere. This can be done by removing air or removing oxygen from the atmosphere. A further example of a neutral atmosphere is a nitrogen atmosphere. Furthermore, the calcination atmosphere could be that of the combustion gases generated from a gas-fired kiln. The time at temperature can depend on the thermal mass being calcined and it is necessary for consistency that adequate time at temperature is utilised to ensure the required degree of crystallinity, homogeneity, acidity and development of microstructure of the solid. After calcination, the zirconium oxide (which may be doped) may then be formed or pressed, for example by being granulated, pelletized, tableted or extruded. These forming or pressing steps may optionally comprise adding a binder.

The method may comprise the optional additional step of deagglomerating or milling the zirconium hydroxide or zirconium oxide. This can be done to zirconium hydroxide or oxide powder or to zirconium hydroxide or oxide in the form of a slurry(ie "wet") in an aqueous or non-aqueous liquid. This step can be carried out using known methods such as sieving, sifting, opposed air milling, impact milling, ball milling, bead milling and the like.

The invention also relates to compositions obtainable by the above process, and applications for the use of the resulting materials, which includes but is not limited to catalysts, catalyst supports or precursors, binders, functional binders, coatings and sorbents.

Figure 2A:
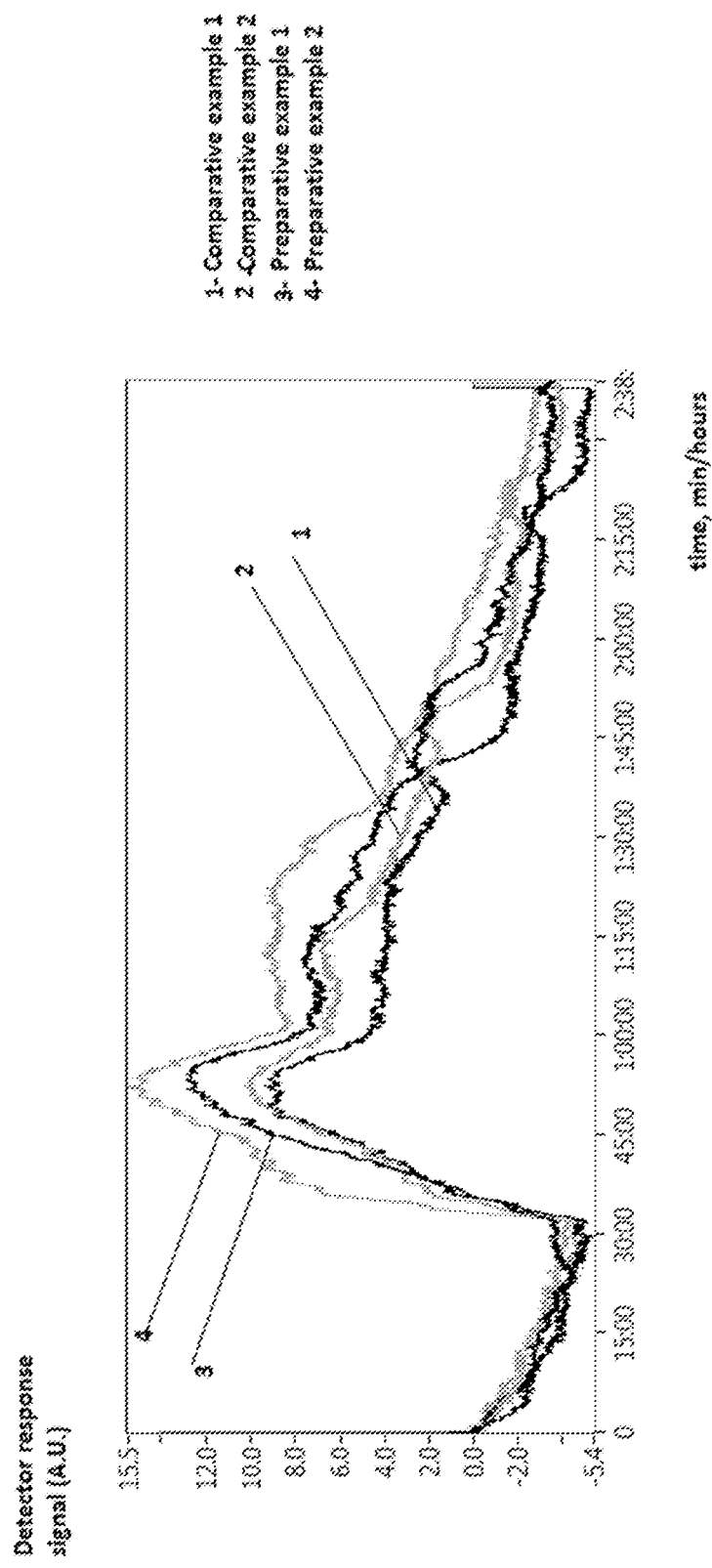
Figure 2B:
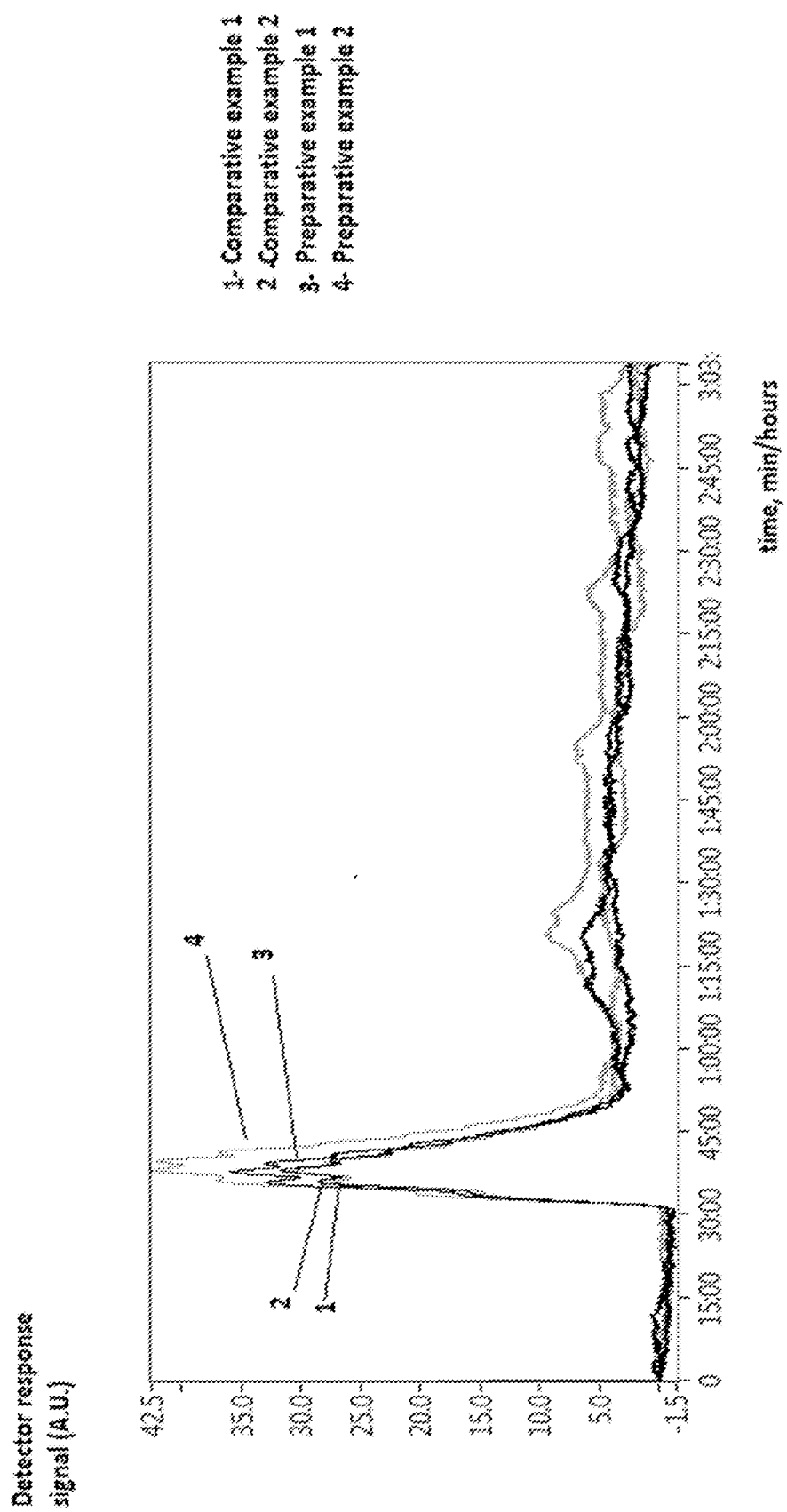
Figure 3:
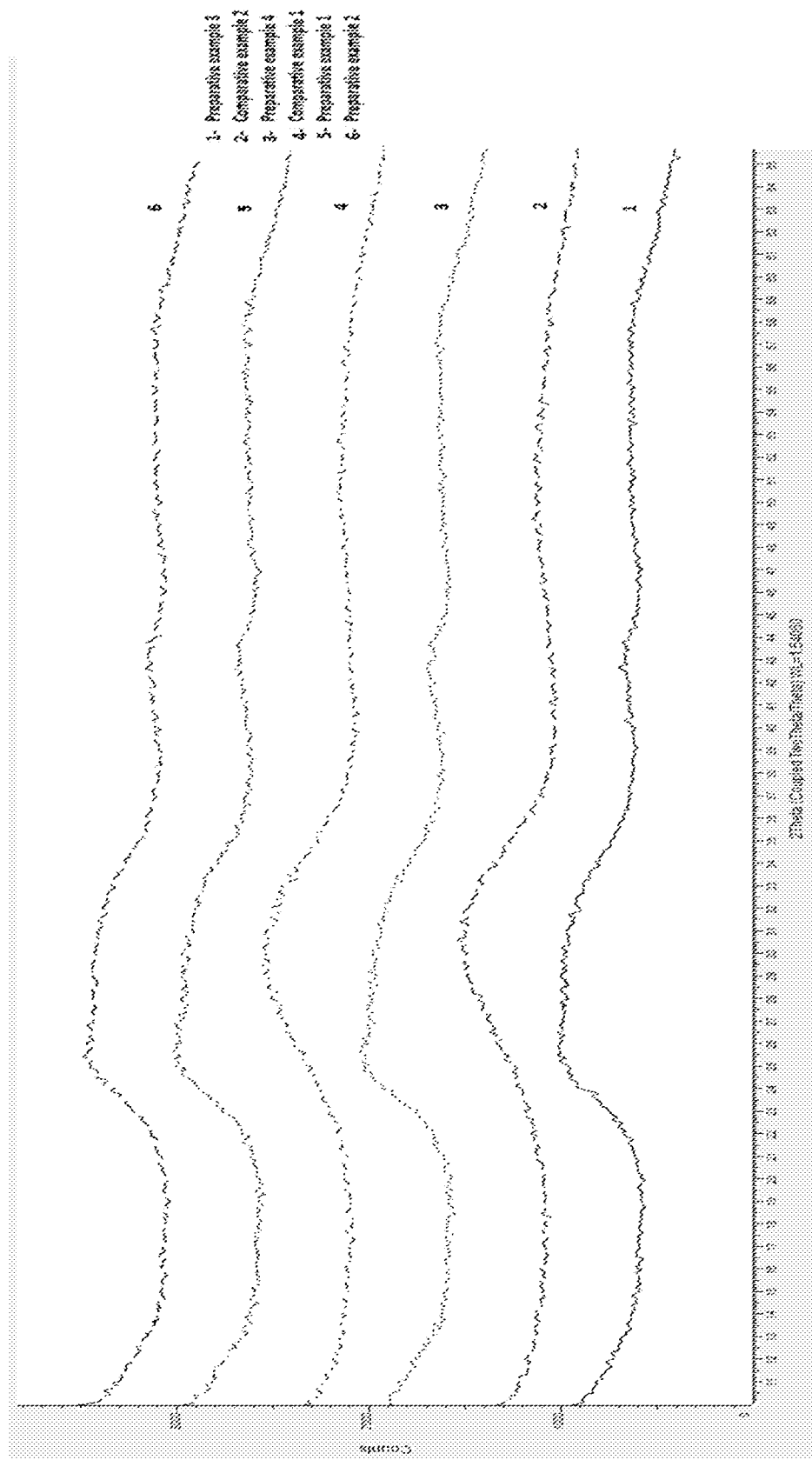
Figure 4:
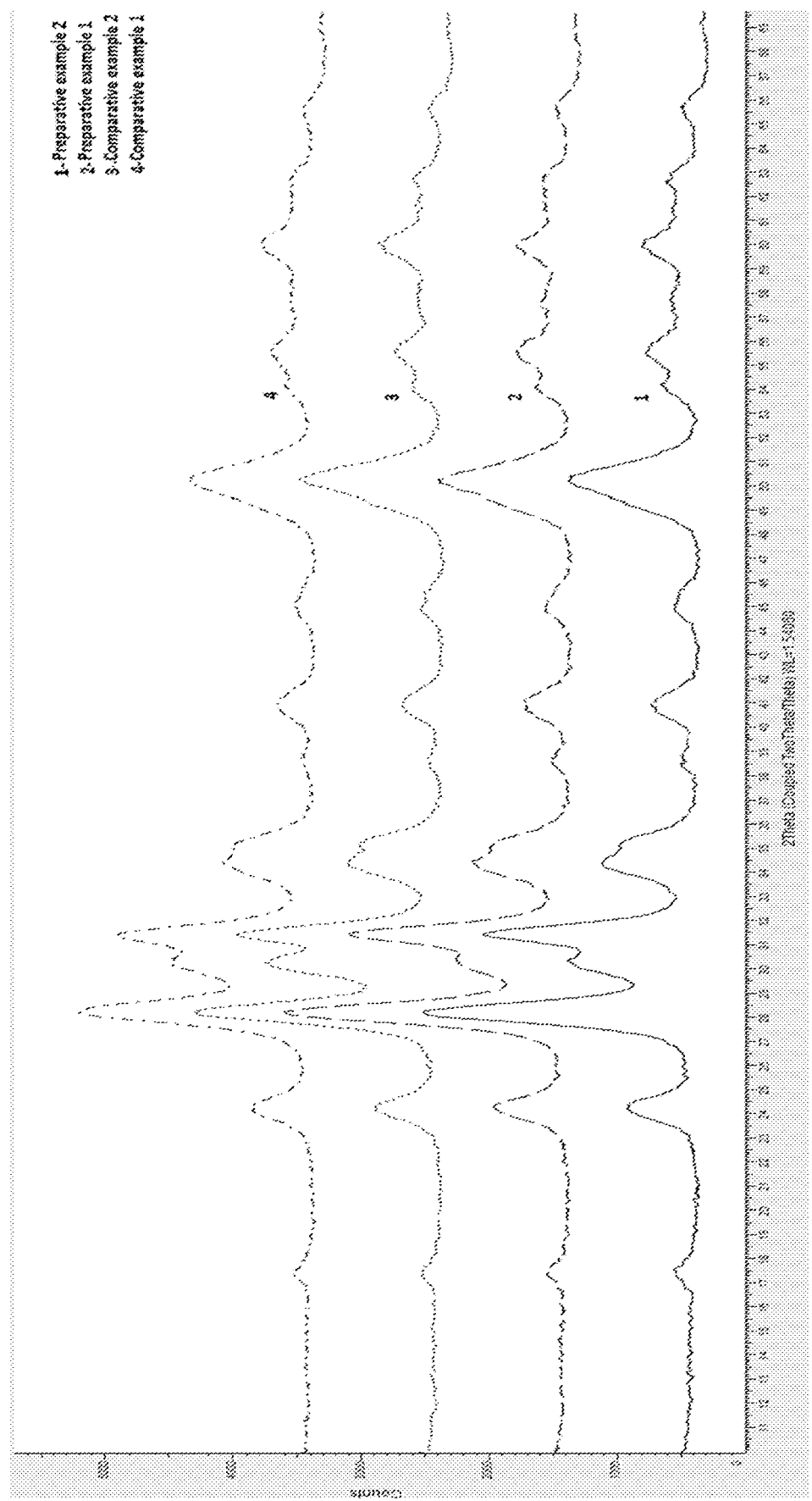
Figure 5A:
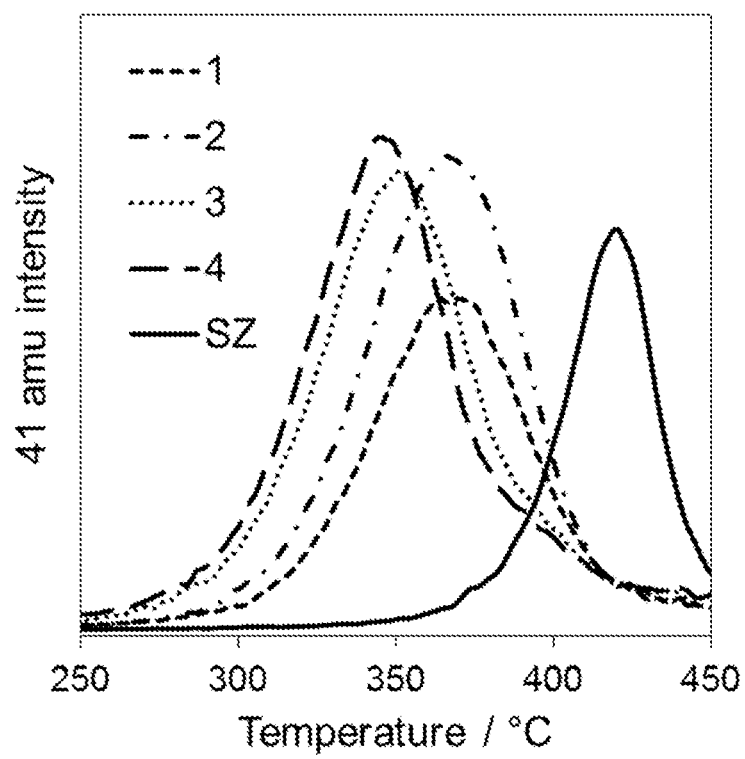
Figure 5B:
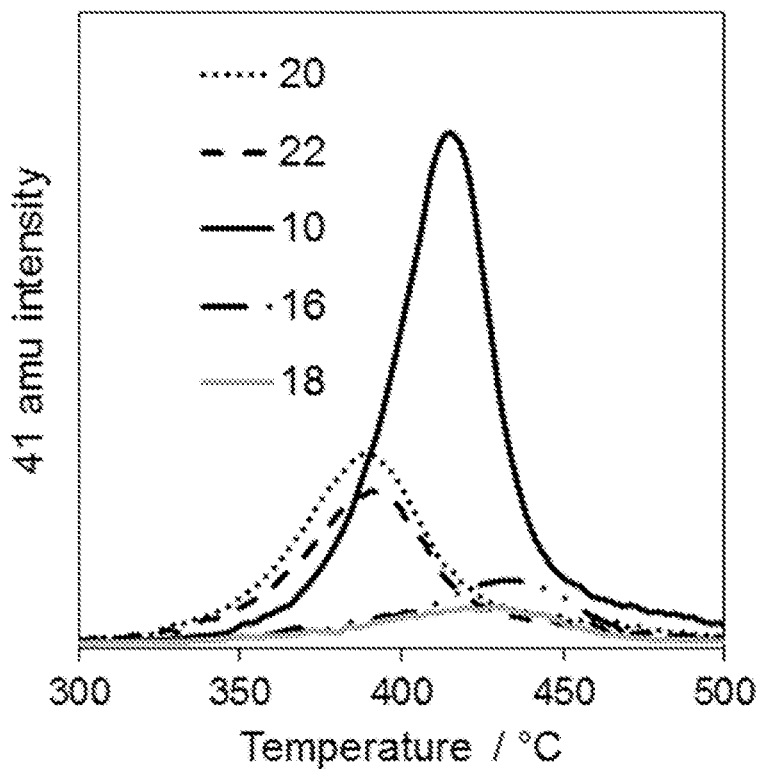

This invention will be further described by reference to the following Figures which are not intended to limit the scope of the invention claimed, in which:

FIG. 1 shows nitrogen adsorption isotherms for the acidic zirconium hydroxides of Comparative Example 2 and Preparative Example 2, FIG. 2a shows $NH_3$-TPD profiles for the acidic zirconium oxides of Comparative Examples 1 and 2, and Preparative Examples 1 and 2, when calcined at 600° C/2 hours, FIG. 2b shows $CO_2$-TPD profiles for the acidic zirconium oxides of Comparative Examples 1 and 2, and Preparative Examples 1 and 2, when calcined at 600° C/2 hours, FIG. 3 shows XRD data for the acid zirconium hydroxides of Comparative Examples 1 and 2, and Preparative Examples 1-4, when dried at 110° C., FIG. 4 shows XRD data for the acid zirconium oxides of Comparative Examples 1 and 2, and Preparative Examples 1 and 2, when calcined at 450° C/2 hours, FIG. 5 shows TPD-MS data showing the intensity at 41 amu as a function of temperature for a) the fresh materials of Comparative Examples 1, 2 and 5, and Preparative Examples 1 and 2; and b) the doped materials after calcination of Comparative Examples 4 and 8 and Preparative Examples 5, 6 and 7.

Figure 6A:
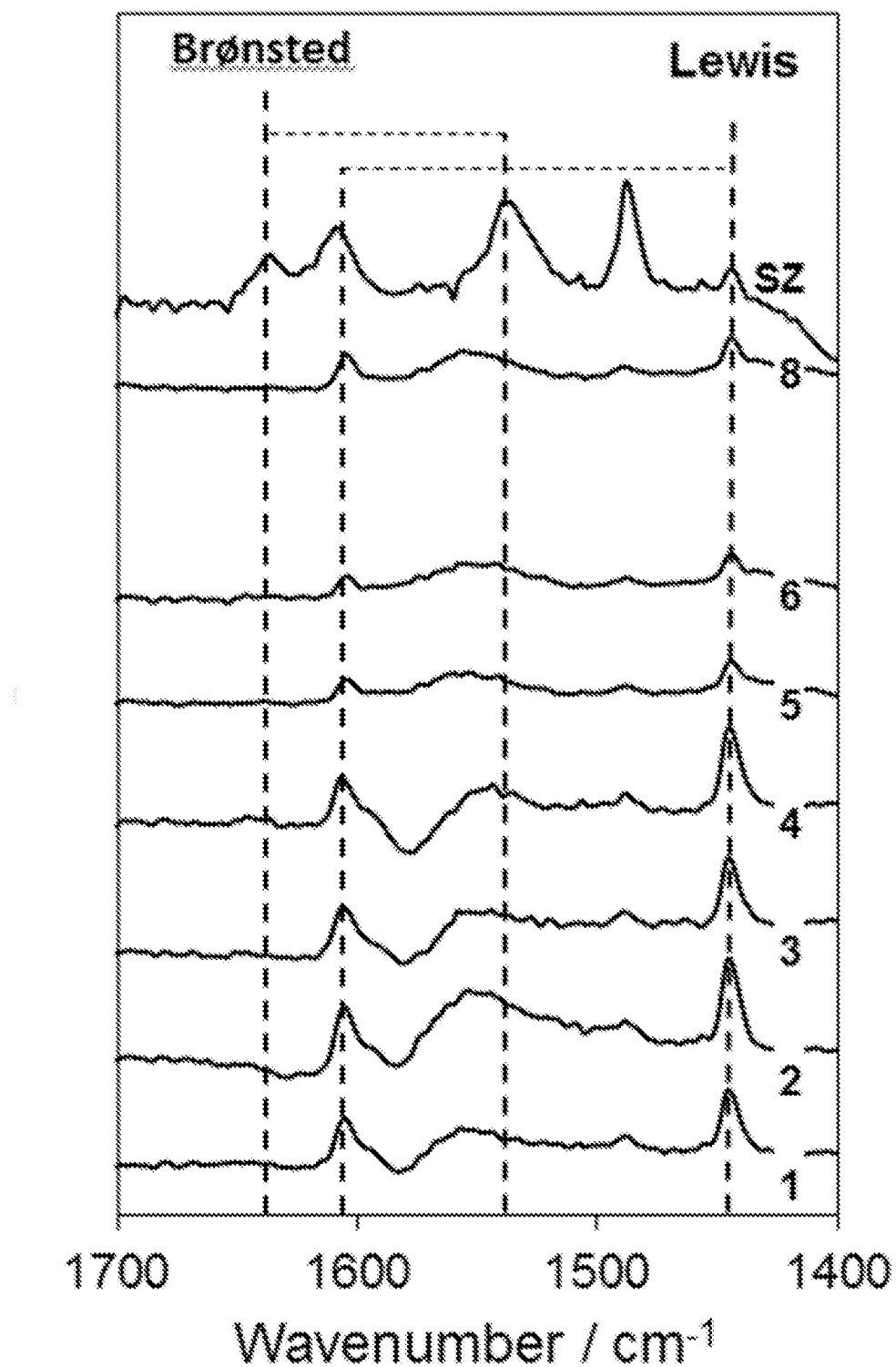
Figure 6B:
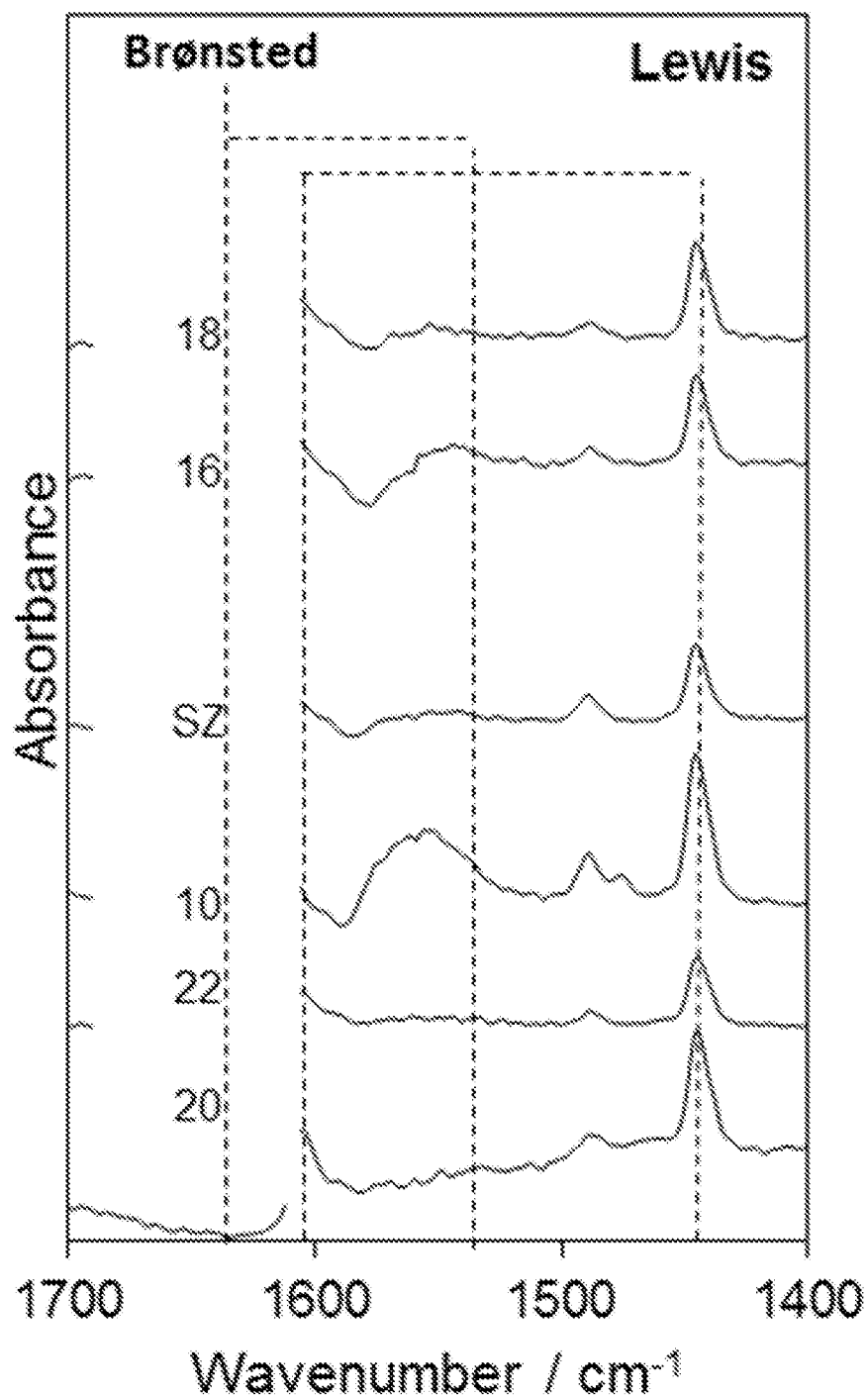

FIG. 6 shows DRIFT spectra of pyridine-saturated acidic zirconia samples recorded at 100° C. in vacuo, for a) fresh and calcined samples of zirconium hydroxide materials from Preparative Examples 1 and 2 and Comparative Examples 1, 2 and 5; and b) doped zirconium oxides after calcination for Preparative Examples 5-7 and Comparative Examples 4, 5 and 8.

Figure 7:
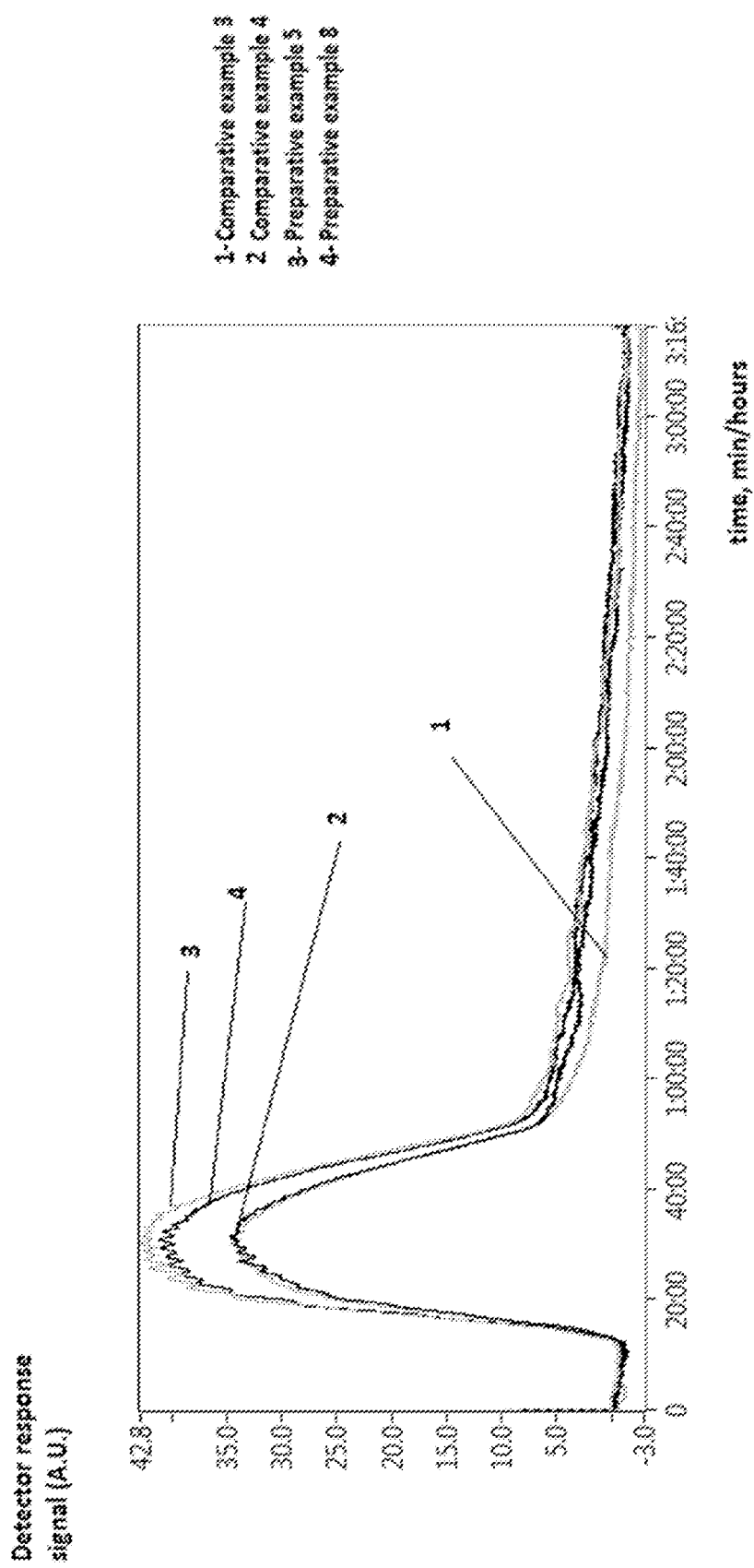
Figure 8:
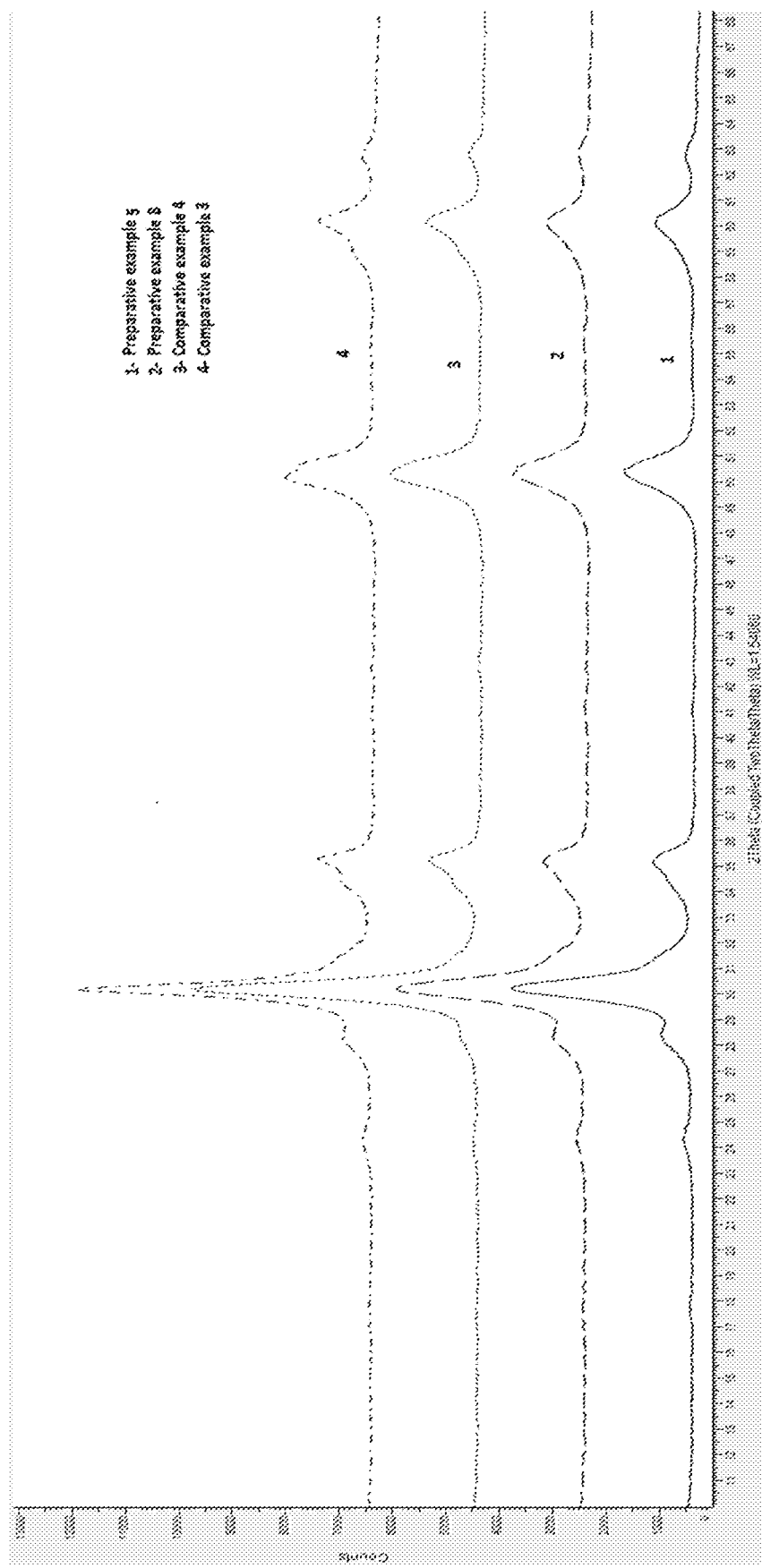
Figure 9:
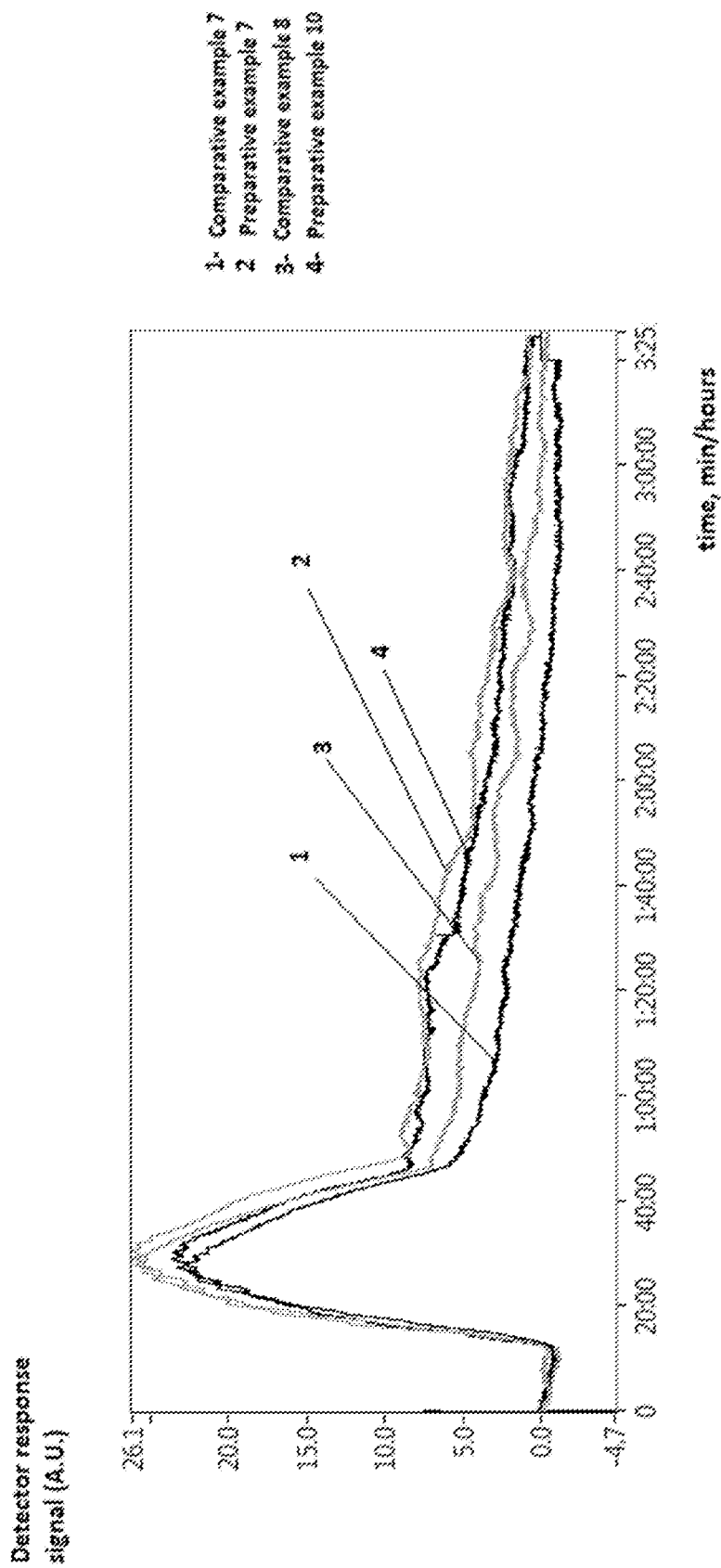
Figure 10:
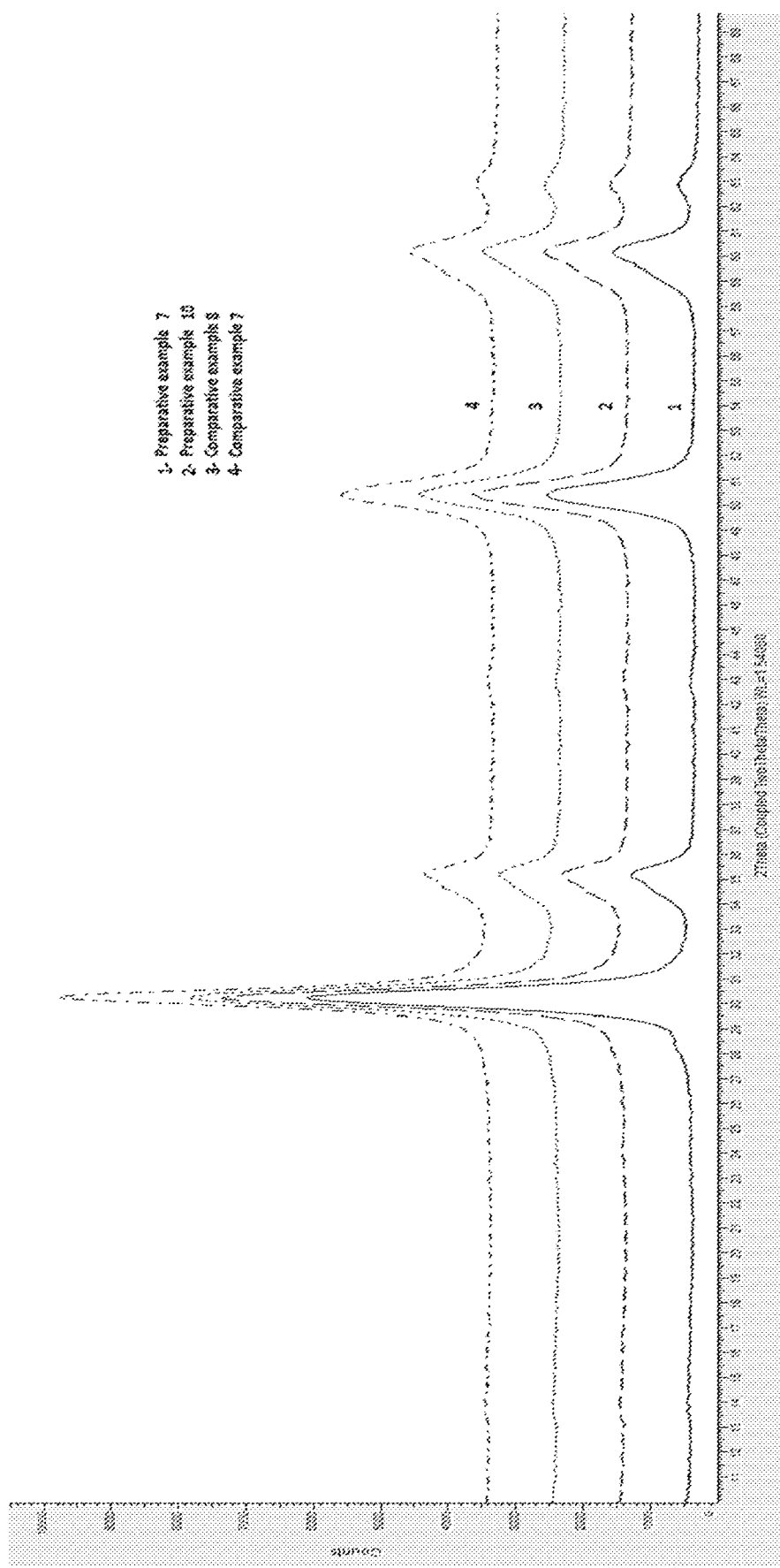
Figure 11:
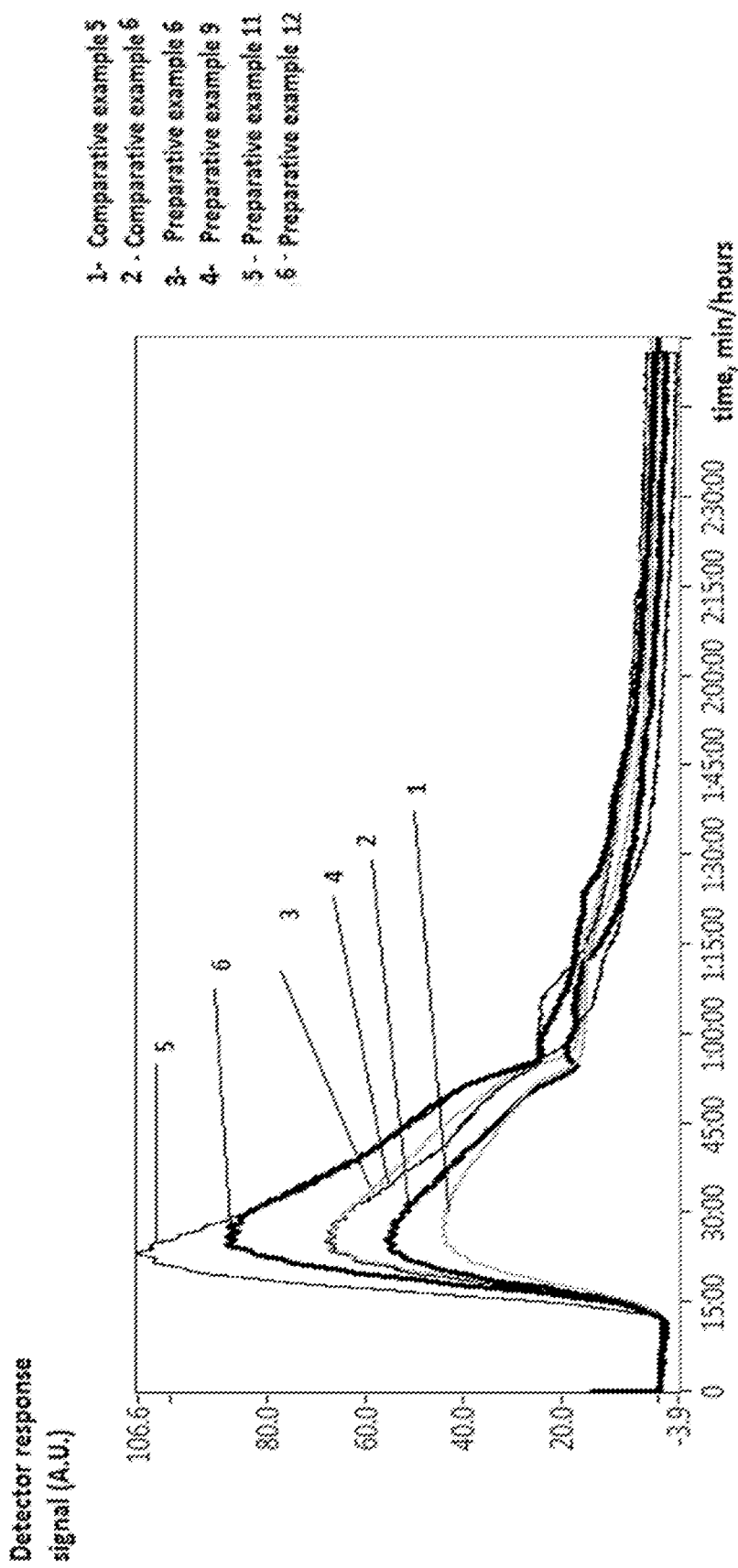
Figure 12:
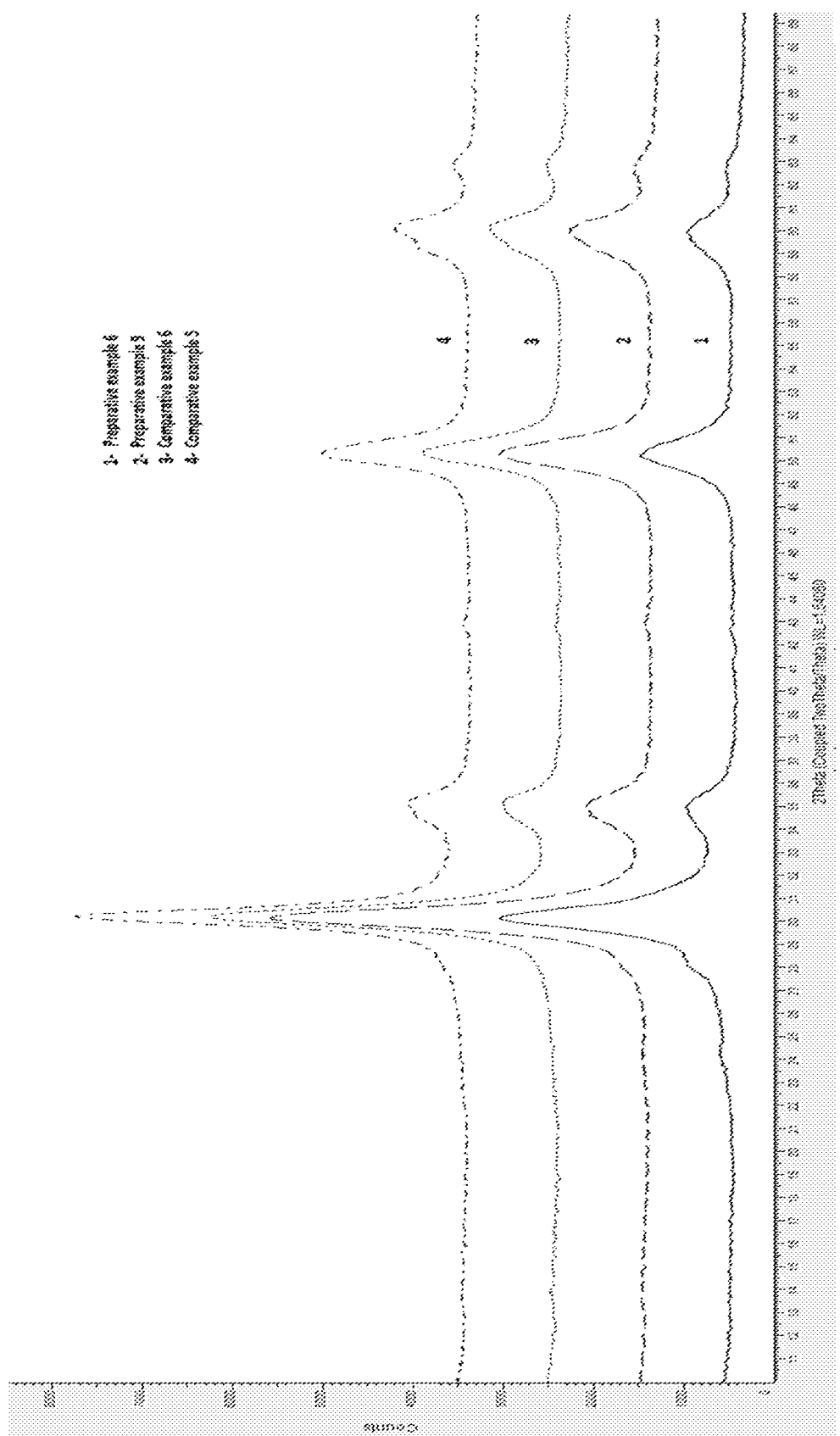
Figure 13:
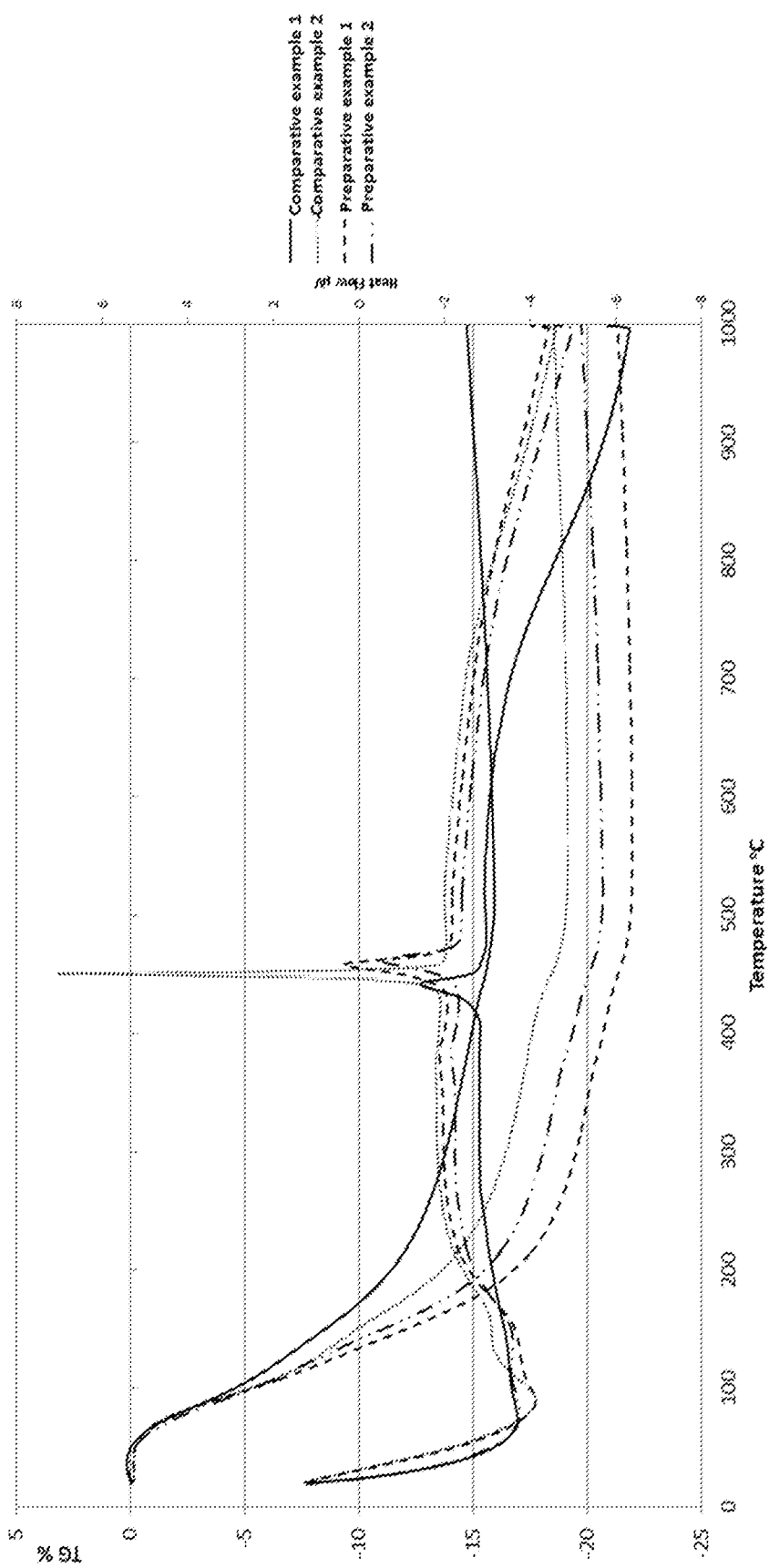

FIG. 7 shows $NH_3$-TPD profiles for the tungsten stabilised zirconium oxides of Comparative Examples 3 and 4, and Preparative Examples 5 and 8, when calcined at 700° C/2 hours, FIG. 8 shows XRD data for the tungsten stabilised zirconium oxides of Comparative Examples 3 and 4, and Preparative Examples 5 and 8, when calcined at 700° C/2 hours, FIG. 9 shows $NH_3$-TPD profiles for the silica stabilised zirconium oxides of Comparative Examples 7 and 8, and Preparative Examples 7 and 10, when calcined at 850° C/2 hours, FIG. 10 shows XRD data for the silica stabilised zirconium oxides of Comparative Examples 7 and 8, and Preparative Examples 7 and 10, when calcined at 850° C/2 hours, FIG. 11 shows $NH_3$-TPD profiles for the sulphate stabilised zirconium oxides of Comparative Examples 5 and 6, and Preparative Examples 6, 9, 11 and 12, when calcined at 600° C/2 hours, FIG. 12 shows XRD data for the sulphate stabilised zirconium oxides of Comparative Examples 5 and 6, and Preparative Examples 6 and 9, when calcined at 600° C/2 hours, and FIG. 13 shows TG-DTA profiles for the acidic zirconium hydroxides of Comparative Examples 1 and 2, and Preparative Examples 1 and 2, when dried at 110° C.

The invention will now be described by way of example with reference to the following Examples.

Comparative Example 1

A slurry of zirconium basic sulphate in deionised water was prepared, containing the equivalent of 200 g $ZrO_2$. 28 wt % aqueous sodium hydroxide was added dropwise until the solution reached pH 13. The resulting precipitated zirconium hydroxide was then filtered and washed. The wet cake was reslurried in deionised water to give 2000 g of slurry and this was hydrothermally treated at 1 barg for 1 hour and then dried at 110° C.

Comparative Example 2

A sample was prepared according to the method described in patent EP 1 984 301 B1. That is, 394.84 g of 20 wt % aqueous sulphuric acid, 18.28 g deionised water and 966.18 g zirconium oxychloride (20.7 wt % $ZrO_2$) were mixed and cooled to −2° C. 10 wt % aqueous sodium hydroxide was then added dropwise until the solution reached pH 8. 28 wt % aqueous sodium hydroxide was then added until the solution reached pH 13. The resulting precipitated zirconium hydroxide was then filtered and washed. The wet cake was reslurried in deionised water and hydrothermally treated at 1 barg for 1 hour and then dried at 110° C.

Comparative Example 3

A sample was prepared according to Comparative Example 1, except that prior to the hydrothermal treatment to the 2000 g slurry an 8 wt % aqueous solution of sodium tungstate was added to target 15.8 wt % $WO_3$ on an oxide basis in the resulting zirconium hydroxide. This slurry was adjusted to pH 6.7 with nitric acid, and the resulting slurry was then filtered and washed with deionised water.

Comparative Example 4

A sample was prepared according to Comparative Example 2, except that prior to hydrothermal treatment 328 g of 8 wt % aqueous solution of sodium tungstate was added to target 15.8 wt % $WO_3$ on an oxide basis in the resulting zirconium hydroxide. This slurry was then adjusted to pH 6.7 with nitric acid, and the resulting slurry was then filtered and washed with deionised water.

Comparative Example 5

A sample was prepared according to Comparative Example 1, except that prior to hydrothermal treatment 390 g of the wet cake was slurried in deionised water and 127.1 g of 20 wt % aqueous sulphuric acid was added to target 10 wt % $SO_3$ on an oxide basis in the resulting zirconium hydroxide.

Comparative Example 6

A sample was prepared according to Comparative Example 2 except that prior to hydrothermal treatment 977 g of the wet cake was slurried in deionised water and 180.9 g of 20 wt % aqueous sulphuric acid was added to target 10% $SO_3$ on an oxide basis in the resulting zirconium hydroxide.

Comparative Example 7

24.17 g of 30 wt % colloidal silica solution (Ludox AS-30) was added to 1761.22 g of the slurry prepared according to Comparative Example 1 prior to hydrothermal treatment. Aqueous 28 wt % sodium hydroxide was added dropwise until the solution reached pH 11. The resulting precipitated mixed zirconium hydroxide was then filtered and washed. The wet cake was reslurried and hydrothermally treated at 1 barg for 5 hour and then dried at 110° C.

Comparative Example 8

A sample was prepared according to Comparative Example 2, except that prior to hydrothermal treatment 900 g of the washed wet cake was slurried in deionised water and 22.6 g of 30 wt % colloidal silica solution (Ludox AS-30) was added.

Preparative Example 1

537.63 g of zirconium basic carbonate (containing 37.2% $ZrO_2$) was dissolved in 490.81 g of dilute nitric acid (to target $NO_3$/Zr ratio of 1.2). This solution was then heated to 60° C. 2.759 g of mandelic acid was added to the solution, along with 390.8 g of water. This solution was then heated again to 94° C. for 2 hours.

The obtained solution was mixed with 465.31 g of deionised water and 394.84 g of 20 wt % aqueous sulphuric acid was then added to the mixture. The pH of the obtained solution was then adjusted to pH 13.0 with a dilute sodium hydroxide solution. The resulting slurry was then filtered and washed. The wet cake was hydrothermally treated at 1 barg for 1 hour and then dried at 110° C.

Preparative Example 2

537.63 of zirconium basic carbonate (containing 37.2% $ZrO_2$) was dissolved in 490.81 g of dilute nitric acid (to target $NO_3$/Zr ratio of 1.45). This solution was then heated. 2.759 g of mandelic acid was added to the solution, along with 390.8 g of water. This solution was then heated to 94° C.

The obtained solution was mixed with 564.01 g of deionised water and 394.84 of 20 wt % aqueous sulphuric acid was added to the mixture. The pH of the obtained solution was then adjusted to pH 13.0 with a dilute sodium hydroxide solution. The resulting slurry was then filtered and washed.

The wet cake was then hydrothermally treated at 1 barg for 1 hour and then dried at 110° C.

Preparative Example 3

A sample was prepared according to the procedures described in Preparative Example 1, but using a lower amount of mandelic acid-13 1.226 g.

Preparative Example 4

A sample was prepared according to the procedures described in Preparative Example 2, but using a lower amount of mandelic acid-13 1.226 g.

Preparative Example 5

A sample was prepared according to Preparative Example 1 except that prior to hydrothermal treatment 1891.2 g of slurry was mixed with 258 g of aqueous sodium tungstate to target 15.8 wt % $WO_3$ on an oxide basis in the resulting zirconium hydroxide. The slurry was then adjusted to pH 6.7 with a dilute nitric acid the resulting slurry was then filtered and washed with deionised water.

Preparative Example 6

A sample was prepared according to the procedure described in the Preparative Example 1, except that dilute sulphuric acid was added after the hydrothermal treatment, but prior to drying. The sample was then dried at 110° C. to give a target $SO_3$ content of 10 wt % on an oxide basis.

Preparative Example 7

A sample of zirconium hydroxide wet cake was prepared according to Preparative Example 1. 12.46 g of 30 wt % colloidal silica solution (Ludox AS-30) was added prior to hydrothermal treatment. The sample was then dried at 110° C. to give a target $SiO_2$ content of 3.5% on an oxide basis.

Preparative Example 8

A sample was prepared according to the procedure described in Preparative Example 5, but using a different ratio of initial reagents such that $NO_3/Zr=1.45$.

Preparative Example 9

A sample was prepared according to the procedure described in Preparative Example 6, but using a different ratio of initial reagents such that $NO_3/Zr=1.45$.

Preparative Example 10

A sample was prepared according to the procedure described in Preparative Example 7, but using a different ratio of initial reagents such that $NO_3/Zr=1.45$.

Preparative Example 11

A sample was prepared according to the procedure described in Preparative Example 1, except that prior to hydrothermal treatment 1812.7 g of the washed slurry was adjusted to pH 6.5 with a dilute sulphuric acid. This gave a resulting $SO_3$ content of 6.5 wt % on oxide basis.

Preparative Example 12

28 g of a sample prepared according to the procedure described in the Preparative Example 1 was mixed with dilute sulphuric acid. This was then further dried at 110° C. for 3 hours to give a target $SO_3$ content of 10 wt % on an oxide basis.

Materials and Methods

The samples prepared in the various examples were analysed as prepared, but samples were also calcined at various temperatures under static air for 2 hours for analysis purposes. The level of Na was confirmed by liquid ion-chromatography (Methrom IC 761) to be less than 200 ppm in all cases.

$SO_3$% content was measured by Eltra Carbon Sulfur Analyzer CS800.

Porosity Characteristics

Surface area, pore diameter and total pore volume measurements were made by liquid nitrogen adsorption at −196° C. in a Micromeritics TriStar 3020 analyser. Samples were degassed at 90° C. under vacuum for 30 minutes before analysis. Surface area: Surface area was measured using BET multipoint determination. Total Pore Volume: Pore volume measurement was taken during desorption at $p/p°=0.9814$. Pore size distribution and average pore diameter: Determination of pore size distribution was done using BJH method (desorption branch) as "Average width vs Incremental Pore Volume" in range 1.7 to 300 nm. The portion of meso+macro-or micropores in % was estimated based on BJH pore size distribution plots.

Particle Size

Particle size distribution was measured via a light scattering method using a Microtrac X100 equipped with an ASVR unit. A standard was run prior to the analysis to confirm the validity of the results. The ASVR unit is automatically filled to a pre-set level with 0.05% Nopcosant K dispersant, approximately 0.100 g of the dry sample was added and then treated for 60 seconds with an internal ultrasonic probe set at 40 Ws. Pre-circulation time was 30 seconds with a run time set at 50 seconds. The sample was measured 3 times (via Mie scattering theory) and an average result was obtained and reported.

Thermogravimetric Analysis (TGA)

The TG-DTA (thermogravimetric analysis-differential thermal analysis) experiments (measurement of samples weight loss (TG) and the exothermic DTA signal (e.g. crystallisation temperature)) were carried out using a Setsys-EVO-DTA Instrument. 50 mg of sample was placed into 100μI Pt crucible and heated in the temperature range 20-1000° C., with the heating rate 10° C./min in the atmosphere of 20% $O_2$/He atmosphere (flowing rate—20 ml/min). Experiment run and data analysis were performed using Data Acquisition Setsys-1750 CS Evol software.

X-Ray Diffraction (XRD)

The powder XRD crystallographic phase analysis of zirconia-based materials was carried out on a Bruker D8 Advance X-ray diffusion system (Diffrac. EVA software, Bragg-Brentano geometry, LYNXEYE detector, Cu radiation ($\lambda=1.5418$ Å) in the 2θ range from 10° to 70°, 0.015° per step, time per step 0.2 s, 0.02 mm Ni filter, applied power 40 mV/40 mA). Quantitative phase analysis was carried out for diffraction patterns of zirconia samples using TOPAS software (version 4.2). Reference materials were used for peak identification (tetragonal zirconia/monoclinic zirconia loaded by Bruker). Data evaluation included peak search, manual/automatic background subtraction and data smoothing. The crystallite size determination was done via the Scherrer method, K=0.9.

Loss Over Ignition (LOI)

Loss over ignition (LOI) was determined using a Vecsrar unit under constant flow of an air atmosphere. Samples (2 g) were heated at a rate of 3° C./min to the desired temperature (generally 1000° C., but for tungsten doped samples this would need to be 800° C.) and held at this temperature for at least 60 minutes and until no change in weight over time is observed.

Acidity Measurements (for Pre-Calcined Samples)

$NH_3/CO_2$—Temperature Programmed Desorption (TPD)—Measurements were taken using AMI200 instrument. 0.2 g of the sample was heated from ambient up to the maximum temperature of the experiment (undoped samples=600° C.; sulphated=544° C.; tungstated=700° C.; silica doped=800° C.) in flowing argon (20 ml/min) at a ramp rate of 20° C./min. The sample was then dwelled at this temperature for 45 mins before being cooled back down to 100° C. 5% $NH_3$/He (or 5% $CO_2$/He) is then flowed over the sample at 100° C. for 30 mins (20 ml/min). The sample was then exposed to flowing helium at 100° C. for 1 hr to remove any non-adsorbed $NH_3$/or $CO_2$ from the system and to allow a steady baseline on the Thermal Conductivity Detector (TCD). A TPD experiment was carried out from 100° C. to the maximum temperature of the experiment at 10° C./min in flowing helium (20 ml/min), with a 2 hr dwell time. The $NH_3$ or $CO_2$ uptake is monitored based on the TCD response. Quantitative analysis was performed based on pulse calibration, whereby a series of pulses of known volume (527 microlitres) of 5% $NH_3$/He or 5% $CO_2$/He were injected into a helium carrier stream and the TCD response was recorded.

Propylamine adsorption/Thermogravimetric Analysis/Mass Spectrometry (TGA-MS)—This was performed by exposing the samples to propylamine overnight. Excess physisorbed propylamine was removed in vacuo at 30° C. prior to temperature programmed desorption on a Mettler Toledo TGA/DSC 2 STARe System equipped with a Pfeiffer Vacuum ThermoStar™ GSD 301 T3 mass spectrometer. The number of acid sites was then calculated based on the mass loss in the temperature range of 200-800 ° C., taking into account the mass change of the clean samples.

Ex-situ pyridine adsorption—This was performed by impregnation of samples with neat pyridine. Excess physisorbed pyridine was removed in a vacuum oven overnight at 30° C. The samples were then diluted (10 wt % in KBr) prior to sample loading in the environmental cell, with Diffuse Reflectance Infra-red Fourier Transform (DRIFT) spectra. Samples were subjected to additional drying under vacuum at 100° C. for 15 min prior to measurements to remove any moisture physisorbed during air exposure.

Results

The results of the testing are set out in Tables 1-7 below. The tables show the following:

Table 1—various properties of the acidic zirconium hydroxides

Table 2—surface properties of the acidic zirconium hydroxides when calcined at 600° C. for 2 hours as measured by $NH_3/CO_2$-TPD Table 3—XRD phase ratio analysis for samples calcined at 450° C. for 2 hours Table 4—surface properties of the acidic zirconium hydroxides, fresh and calcined at 600° C. for 2 hours, when measured by propylamine-TPD Table 5—surface properties of tungsten stabilised zirconium hydroxides when calcined at 700° C. for 2 hours as measured by $NH_3$-TPD Table 6—surface properties of silica stabilised zirconium hydroxides when calcined at 850° C. for 2 hours as measured by $NH_3$-TPD Table 7—surface properties of sulphate stabilised zirconium hydroxides when calcined at 600° C. for 2 hours as measured by $NH_3$-TPD.

The process route of the invention shows improved thermostability for undoped zirconium hydroxides and corresponding oxides after calcination at high temperature (900° C.), retaining good porosity with a significant portion of mesopores. The calcined undoped zirconium hydroxide materials show more influence by the monoclinic phase, which can be important for particular uses of the materials. The porosity of the doped hydroxides has also been improved in comparison with the tested benchmarks. There is a general significant increase in acidity (strength of acid sites) has been noticed for both types of materials (undoped/doped).

With regards to acidity: concentration of acid sites, their strength and type have been confirmed by propylamine adsorption/TGA-MS (FIG. 5) and ex-situ pyridine adsorption (DFTIR) (FIG. 6). Data (peak area) presented in FIG. 5a shows significantly higher acid loading for the undoped zirconium hydroxides samples compared to the commercial sulphated zirconia—a well-known superacid. Also, strong acidity for all samples has been proven by the temperature of propene release (41 amu). It has been found that acid strength increases from the sample 1 and 2 (comparative, peak centred around 368° C.,) to inventive samples 3 (352° C.) and 4 (346° C.) respectively, and exceed the value for the standard benchmark (423° C.). The obtained data demonstrates that the materials of the invention are strongly acidic even without the addition of stabilising dopants, which makes them unique among other well-known zirconias.

DRIFT spectra of pyridine impregnated samples (FIG. 6) prove the Lewis acid nature of the tested samples due to the presence of an absorbance peak at 1446 and 1604 $cm^{-1}$—the main characteristics of Lewis acid sites.

Doped materials (sulphate, tungsten or silica etc) showed similar trends in terms of acidity and porosity characteristics. Significant improvement has been noticed (porosity increased by 30%, acidity (measured by $NH_3$-TPD) by 25% (Tables 5, 6 and 7) compared to standard commercial grades, which has a positive impact on catalytic activity and makes them competitive on the heterogeneous catalysis market.

TABLE 1

| Reference | Surface area SA, (m²/g) | Total pore volume TPV, (ml/g) | Pore diameter d, nm | Particle size, laser light scattering Low ultrasonic/high ultrasonic | | | LOI % @1000° C. | T cryst, ° C. |
| --- | --- | --- | --- | --- | --- | --- | --- | --- |
| | | | | d10 (microns) | d50 (microns) | d90 (microns) | | |
| Preparative Example 3 | 490 | 0.85 | 6.9 | 6.1/0.6 | 42/1.1 | 106/10 | 28.5 | 458 |
| Preparative Example 1 | 520 | 0.94 | 7.2 | 6.7/1.9 | 47/10 | 110/48 | 37.0 | 457 |
| Preparative Example 4 | 540 | 0.99 | 7.3 | 6.5/1.0 | 44/3.8 | 94/17 | 29.9 | 456 |
| Preparative Example 2 | 540 | 0.99 | 7.3 | 6.8/0.6 | 40/1.0 | 87/10 | 37.0 | 460 |
| Comparative Example 2 | 520 | 0.73 | 5.6 | 4.5/1.5 | 28/5.6 | 70/14 | 27.5 | 441 |
| Comparative Example 1 | 570 | 0.39 | 2.7 | 6.4/1.5 | 43/6.7 | 95/11 | 21.4 | 451 |

| | SA | TPV | d, nm | ASA | TPV, | d, nm |

TABLE 1-continued

| Reference | 600° C./ 2 hours (m²/g) | 600° C./ 2 hours (ml/g) | 600° C./ 2 hours (nm) | Micr % | Meso + Macro % | 900° C./ 2 hours (m²/g) | 900° C./ 2 hours (ml/g) | 900° C./ 2 hours (nm) |
|---|---|---|---|---|---|---|---|---|
| Preparative Example 3 | 55 | 0.37 | 26.6 | 21 | 79 | 20 | 0.2 | 40.0 |
| Preparative Example 1 | 55 | 0.42 | 30.4 | 20 | 80 | 19 | 0.19 | 40.0 |
| Preparative Example 4 | 55 | 0.36 | 27.4 | 22 | 78 | 17 | 0.11 | 27.1 |
| Preparative Example 2 | 60 | 0.36 | 24.1 | 19 | 81 | 20 | 0.13 | 26.7 |
| Comparative Example 2 | 45 | 0.25 | 22.0 | 34 | 66 | 13 | 0.08 | 24.4 |
| Comparative Example 1 | 41 | 0.31 | 13.1 | 74 | 26 | 9.6 | 0.05 | 22.0 |

TABLE 2

| Reference | Total $NH_3$, µmol/g | Total $NH_3$, µmol/m² | $T_{max}$ $NH_3$ (° C.) | Total $CO_2$, µmol/g | Total $CO_2$, µmol/m² | $CO_2$, µmol/g at T = 400-600 C. | $T_{max}$ $CO_2$, (° C.) |
|---|---|---|---|---|---|---|---|
| Preparative Example 1 | 217.8 | 3.96 | 337 | 126.0 | 2.29 | 16.8 | 172 |
| Preparative Example 2 | 290.7 | 4.84 | 318 | 163.3 | 2.72 | 18.6 | 175 |
| Comparative Example 2 | 215.3 | 4.78 | 324 | 124.5 | 2.77 | 9.2 | 176 |
| Comparative Example 1 | 200.1 | 4.88 | 315 | 104.8 | 2.56 | 12.6 | 174 |

TABLE 3

| Conditions | % monoclinic | % tetragonal |
|---|---|---|
| Comparative Example 2 | 74.82 | 25.18 |
| Comparative Example 1 | 77.45 | 22.55 |
| Preparative Example 1 | 85.61 | 14.39 |
| Preparative Example 2 | 83.68 | 16.32 |

TABLE 4

| Reference | Sample (key for FIGS. 5 and 6) | Dopant | Total propylamine uptake (acid loading)/µmol g⁻¹ | $T_{max}$/° C. |
|---|---|---|---|---|
| Comparative Example 2 | 1 | None | 1210 | 368 |
| Comparative Example 1 | 2 | None | 1270 | 368 |
| Preparative Example 1 | 3 | None | 1340 | 352 |
| Preparative Example 2 | 4 | None | 1320 | 346 |
| Comparative Example 2 - calcined | 5 | None | 90 | 336 |
| Comparative Example 1 - calcined | 6 | None | 80 | 336 |
| Preparative Example 2 calcined | 8 | None | 120 | 336 |
| Comparative Example 5 - calcined | SZ | $SO_3$ | 750 | 423 |
| Preparative Example 5 calcined | 20 | $WO_3$ | 300 | 390 |
| Comparative Example 4 calcined | 22 | $WO_3$ | 250 | 390 |
| Preparative example 6 calcined | 10 | $SO_3$ | 940 | 415 |
| Preparative Example 7 calcined | 16 | $SiO_2$ | 180 | 433 |
| Comparative example 8 Calcined | 18 | $SiO_2$ | 160 | 427 |

TABLE 5

| Reference | wt % WO$_3$ (on oxide) | Surface area, SA (m$^2$/g) | Total pore volume, TPV (ml/g) | Pore diameter, d nm | Particle size, laser light scattering | | | SA 700° C./2 hours (m$^2$/g) | TPV 700° C./2 hours (ml/g) | d, nm 700° C./2 hours (nm) | Total NH$_3$, 700° C./2 hours, µmol/g | Total NH$_3$, 70° C./2 hours, µmol/m$^2$ | T$_{max}$ NH$_3$, 700° C./2 hours (° C.) |
|---|---|---|---|---|---|---|---|---|---|---|---|---|---|
| | | | | | d10 (microns) | d50 (microns) | d90 (microns) | | | | | | |
| Preparative Example 5 | 16.1 | 520 | 0.97 | 7.45 | 6.5 | 46 | 97 | 116 | 0.44 | 15.4 | 509 | 4.39 | 303 |
| Preparative Example 8 | 16.1 | 580 | 0.91 | 6.3 | 5.0 | 44 | 93 | 108 | 0.34 | 12.6 | 503 | 4.65 | 305 |
| Comparative Example 4 | 15.7 | 360 | 0.57 | 6.3 | 2.0 | 37 | 215 | 96 | 0.32 | 13.3 | 408 | 4.25 | 309 |
| Comparative Example 3 | 15.5 | 370 | 0.4 | 4.2 | 1.4 | 5.6 | 9.6 | 117 | 0.26 | 8.8 | 390 | 3.33 | 301 |

TABLE 6

| Reference | wt % SiO$_2$ (on oxide) | Surface area, SA (m$^2$/g) | Total pore volume, TPV (ml/g) | Pore diameter, d (nm) | Particle size, laser light scattering | | | SA 850° C./2 hours (m$^2$/g) | TPV 850° C./2 hours (ml/g) | d, nm 850° C./2 hours (nm) | Total NH$_3$, 850° C./2 hours, µmol/g | Total NH$_3$, 850° C./2 hours, µmol/m$^2$ | T$_{max}$ NH$_3$, 850° C./2 hours (° C.) |
|---|---|---|---|---|---|---|---|---|---|---|---|---|---|
| | | | | | d10 (microns) | d50 (microns) | d90 (microns) | | | | | | |
| Preparative example 7 | 3.4 | 530 | 1.02 | 7.7 | 6.8 | 46 | 100 | 95 | 0.37 | 15.5 | 427 | 4.49 | 296 |
| Preparative example 10 | 3.1 | 580 | 0.94 | 6.5 | 3.7 | 36 | 87 | 85 | 0.27 | 12.8 | 384 | 4.52 | 292 |
| Comparative example 8 | 4.0 | 540 | 0.98 | 7.3 | 4.3 | 29 | 114 | 95 | 0.36 | 15.1 | 312 | 3.28 | 275 |
| Comparative example 7 | 3.6 | 530 | 0.39 | 2.9 | 1.3 | 3.9 | 6.6 | 80 | 0.13 | 6.5 | 261 | 3.26 | 274 |

TABLE 7

| Reference | wt % SO$_3$ (on oxide) | Surface area, SA (m$^2$/g) | Total pore volume, TPV, (ml/g) | Pore diameter, d nm | Particle size, laser light scattering | | | SA 600° C./2 hours (m$^2$/g) | TPV 600° C./2 hours (ml/g) | d, nm 600° C./2 hours (nm) | Total NH$_3$, 600° C./2 hours µmol/g | Total NH$_3$, 600° C./2 hours µmol/m$^2$ | T$_{max}$ NH$_3$, 600° C./2 hours (° C.) |
|---|---|---|---|---|---|---|---|---|---|---|---|---|---|
| | | | | | d10 (microns) | d10 (microns) | d10 (microns) | | | | | | |
| Preparative Example 6 | 8.0 | 530 | 0.82 | 0.82 | 5.4 | 37 | 83 | 165 | 0.42 | 10.2 | 967.2 | 5.86 | 253 |
| Preparative Example 9 | 10.0 | 420 | 0.71 | 6.8 | 5.5 | 40 | 86 | 160 | 0.36 | 9.1 | 1002 | 6.26 | 264 |
| Comparative Example 6 | 9.5 | 350 | 0.45 | 5.2 | 1.8 | 63 | 312 | 120 | 0.25 | 8.2 | 716 | 5.96 | 247 |
| Comparative Example 5 | 9.6 | 350 | 0.30 | 2.9 | 1.3 | 3.0 | 5.3 | 120 | 0.14 | 4.8 | 589 | 4.90 | 274 |
| Preparative example 11 | 6.5 | 620 | 1.09 | 7.1 | 6.6 | 42 | 95 | 170 | 0.45 | 10.7 | 1100 | 9.96 | 228 |
| Preparative example 12 | 9.5 | 540 | 0.91 | 6.7 | 7.1 | 43 | 100 | 170 | 0.46 | 11.1 | 1067 | 6.27 | 256 |

The invention claimed is:

1. A zirconium hydroxide comprising, on an oxide basis, less than 0.1 wt % of a dopant comprising one or more of silicon, sulphate, phosphate, tungsten, niobium, aluminium, molybdenum, titanium or tin, and having acid sites, wherein the zirconium hydroxide is porous and, in relation to the pores having a pore diameter of up to 155 nm, at least 70% of the pore volume provided by pores having a pore diameter of 3.5-155 nm as measured using the BJH method.

2. The zirconium hydroxide as claimed in claim 1, wherein, in relation to the pores having a pore diameter of up to 155 nm, at least 75% of its pore volume provided by pores having a pore diameter of 3.5-155 nm as measured using the BJH method.

3. A catalyst, catalyst support or precursor, binder, functional binder, coating or sorbent comprising the zirconium hydroxide as claimed in claim 1 or an oxide obtained therefrom.

4. The zirconium hydroxide as claimed in claim 1 wherein the majority of the acid sites are Lewis acid sites.

5. A zirconium oxide comprising at least 99 wt% zirconium oxide including hafnium oxide or hydroxide impurity and, on an oxide basis, less than 0.1 wt % of a dopant comprising one or more of silicon, sulphate, phosphate, tungsten, niobium, aluminium, molybdenum, titanium, tin or a rare earth metal, and having acid sites, having a total pore volume as measured by $N_2$ physisorption of at least 0.10 cm$^3$/g after calcination at 900° C. in an air atmosphere for 2 hours.

6. The zirconium oxide of claim 5 having an acid loading of at least 100 µmol/g as measured by propylamine TPD after calcination at 600° C. in an air atmosphere for 2 hours.

7. A zirconium oxide comprising at least 99 wt % zirconium oxide including hafnium oxide or hydroxide impurity and, on an oxide basis, less than 0.1 wt % of a dopant comprising one or more of silicon, sulphate, phosphate, tungsten, niobium, aluminium, molybdenum, titanium, tin or a rare earth metal, and having acid sites, having at least 80 wt % of monoclinic phase as measured by XRD after calcination at 450° C. in an air atmosphere for 2 hours, having a $CO_2$ uptake of at least 14 µmol/g at 400-600° C. as measured by TPD after calcination at 600° C. for 2 hours.

8. A doped zirconium hydroxide comprising, on an oxide basis, 0.1-30 wt % of a sulphate, having acid sites, having a surface area of at least 375m$^2$/g and having a total pore volume as measured by $N_2$ physisorption of at least 0.60 cm$^3$/g.

9. The doped zirconium hydroxide as claimed in claim 8 comprising, on an oxide basis, 1-12 wt % of a sulphate.

10. The doped zirconium hydroxide as in claim 8 comprising one or more of an additional dopant selected from a rare earth hydroxide or oxide, yttrium hydroxide or oxide, or another transition metal hydroxide or oxide, such that the total zirconium content of the zirconium hydroxide is not less than 50 wt % on an oxide basis.

11. The doped zirconium hydroxide as claimed in claim 8 wherein the majority of the acid sites are Lewis acid sites.

12. The doped zirconium hydroxide of claim 8 having an uncalcined mean pore diameter of at least 5.5 nm and a mean pore diameter of not more than 40.0 nm after calcination at 900° C. in an air atmosphere for 2 hours.

13. A catalyst, catalyst support or precursor, binder, functional binder, coating or sorbent comprising the doped zirconium hydroxide as claimed in claim 8 or an oxide obtained therefrom.

14. A doped zirconium hydroxide comprising, on an oxide basis, 0.1-30 wt % of a tungsten hydroxide or oxide, having acid sites and having a surface area of at least 400 m$^2$/g.

15. The doped zirconium hydroxide as claimed in claim 14 having a total pore volume as measured by $N_2$ physisorption of at least 0.7 cm$^3$/g.

16. The doped zirconium hydroxide as claimed in claim 14 comprising, on an oxide basis, 12-20 wt % of a tungsten hydroxide or oxide.

17. The doped zirconium hydroxide as in claim 14 comprising one or more of an additional dopant selected from a rare earth hydroxide or oxide, yttrium hydroxide or oxide, or another transition metal hydroxide or oxide, such that the total zirconium content of the zirconium hydroxide is not less than 50 wt % on an oxide basis.

18. A catalyst, catalyst support or precursor, binder, functional binder, coating or sorbent comprising the doped zirconium hydroxide as claimed in claim 14 or an oxide obtained therefrom.

19. A zirconium oxide comprising at least 99wt% zirconium oxide including hafnium oxide or hydroxide impurity and, on an oxide basis, less than 0.1 wt % of a dopant comprising one or more of silicon, sulphate, phosphate, tungsten, niobium, aluminium, molybdenum, titanium, tin or a rare earth metal, and having acid sites, having a $CO_2$ uptake of at least 14 µmol/g at 400-600° C. as measured by TPD after calcination at 600° C. for 2 hours.

* * * * *